(12) United States Patent
Duvur et al.

(10) Patent No.: US 11,748,090 B2
(45) Date of Patent: Sep. 5, 2023

(54) CLOUD SERVICES RELEASE ORCHESTRATION

(71) Applicant: Salesforce.com, Inc., San Francisco, CA (US)

(72) Inventors: Sreeram Duvur, Fremont, CA (US); Vijayanth Devadhar, Fremont, CA (US); Matthew Gainsborough, Oakland, CA (US); Kiet Phong, Newcastle, WA (US); Sathish Santhanam, Fremont, CA (US); Lawrence Thomas Lopez, Cupertino, CA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 18/049,265

(22) Filed: Oct. 24, 2022

(65) Prior Publication Data
US 2023/0087544 A1 Mar. 23, 2023

Related U.S. Application Data

(63) Continuation of application No. 17/225,143, filed on Apr. 8, 2021, now Pat. No. 11,507,364, which is a (Continued)

(51) Int. Cl.
G06F 8/65 (2018.01)
(52) U.S. Cl.
CPC .................................. G06F 8/65 (2013.01)
(58) Field of Classification Search
CPC ...................................................... G06F 8/65
See application file for complete search history.

(56) References Cited

U.S. PATENT DOCUMENTS 6,502,102 B1  12/2002  Haswell et al.
6,701,514 B1   3/2004  Haswell et al.
(Continued)

OTHER PUBLICATIONS

Adrian Holzer et al., Mobile App Development: Native or Web?, [Online], pp. 1-7, [Retrieved from Internet on Jul. 2, 2022], <https://d1wqtxts1xzle7.cloudfront.net/38245540/camera-ready-2012-WEB-Holzer-Ondrus-with-cover-page-v2.pdf> (Year: 2012).
(Continued)

Primary Examiner — Ziaul A Chowdhury
(74) Attorney, Agent, or Firm — Nicholson De Vos Webster & Elliott LLP

(57) ABSTRACT

According to some implementations, while a proxy routes production traffic to a first application (app) version that runs in a plurality of container orchestration system (cos) pods having first app version containers, configuration information is received including an identification of a second app version container image for a second app version. The second app version is an updated version of the first app version. Cos pods having second app version containers are brought up based on the second app version container image identified in the configuration information. Test and/or warmup traffic is caused to be routed to the second app version containers. Responsive to an indication regarding the routing of the test and/or warmup traffic to the second app version, causing a transition to sending production traffic to the second app version containers instead of to the first app version.

17 Claims, 7 Drawing Sheets

Related U.S. Application Data continuation of application No. 16/261,501, filed on Jan. 29, 2019, now Pat. No. 11,003,434.

(56) References Cited

U.S. PATENT DOCUMENTS

| | | | |
|---|---|---|---|
| 7,155,462 B1 | 12/2006 | Singh et al. | |
| 7,730,478 B2 | 6/2010 | Weissman | |
| 8,793,691 B2 | 7/2014 | Devadhar | |
| 9,268,605 B2 | 2/2016 | Wang et al. | |
| 9,367,595 B1 | 6/2016 | Malks et al. | |
| 9,448,790 B2 * | 9/2016 | Collison | G06F 8/60 |
| 9,519,547 B2 | 12/2016 | Devadhar | |
| 9,858,187 B2 | 1/2018 | Sundaravaradan et al. | |
| 9,984,002 B2 | 5/2018 | Sundaravaradan et al. | |
| 9,990,400 B2 | 6/2018 | Sundaravaradan et al. | |
| 10,013,501 B2 | 7/2018 | Sundaravaradan et al. | |
| 10,019,297 B2 | 7/2018 | Helmich et al. | |
| 10,089,209 B1 | 10/2018 | Russell | |
| 10,162,650 B2 | 12/2018 | Frank et al. | |
| 10,218,813 B2 | 2/2019 | Peschansky et al. | |
| 10,303,576 B1 | 5/2019 | Seymour et al. | |
| 10,452,997 B2 | 10/2019 | Yang et al. | |
| 10,474,559 B2 | 11/2019 | Moorthi et al. | |
| 10,491,664 B2 | 11/2019 | Tan et al. | |
| 10,558,457 B1 | 2/2020 | Kolb et al. | |
| 10,768,923 B2 | 9/2020 | Phong et al. | |
| 10,776,099 B2 | 9/2020 | Duvur et al. | |
| 10,810,003 B2 | 10/2020 | Gainsborough et al. | |
| 10,817,497 B2 | 10/2020 | Zaslavsky et al. | |
| 10,904,122 B2 | 1/2021 | Wang et al. | |
| 11,108,847 B2 | 8/2021 | Tan et al. | |
| 11,507,364 B2 | 11/2022 | Duvur et al. | |
| 2011/0264765 A1 | 10/2011 | Devadhar | |
| 2012/0330913 A1 | 12/2012 | Devadhar | |
| 2013/0311926 A1 | 11/2013 | Keegan et al. | |
| 2014/0075445 A1 | 3/2014 | Wang et al. | |
| 2014/0143401 A1 | 5/2014 | Carlen et al. | |
| 2014/0304246 A1 | 10/2014 | Helmich et al. | |
| 2015/0082374 A1 | 3/2015 | Dobson et al. | |
| 2015/0128105 A1 | 5/2015 | Sethi et al. | |
| 2015/0379579 A1 | 12/2015 | Chiang et al. | |
| 2016/0119244 A1 | 4/2016 | Wang et al. | |
| 2016/0134596 A1 | 5/2016 | Kovacs et al. | |
| 2016/0239011 A1 | 8/2016 | Lo et al. | |
| 2016/0316310 A1 | 10/2016 | Strom et al. | |
| 2017/0054797 A1 | 2/2017 | Helmich et al. | |
| 2017/0116130 A1 | 4/2017 | Sundaravaradan et al. | |
| 2017/0116135 A1 | 4/2017 | Sundaravaradan et al. | |
| 2017/0180249 A1 | 6/2017 | Shen et al. | |
| 2017/0286614 A1 | 10/2017 | Morris et al. | |
| 2018/0146069 A1 | 5/2018 | Du et al. | |
| 2018/0210814 A1 | 7/2018 | Mevorach et al. | |
| 2019/0020665 A1 | 1/2019 | Surcouf et al. | |
| 2019/0058722 A1 | 2/2019 | Levin et al. | |
| 2019/0171443 A1 * | 6/2019 | Nagae | G06F 8/65 |
| 2019/0289057 A1 | 9/2019 | Chen et al. | |
| 2020/0099610 A1 | 3/2020 | Heron et al. | |
| 2020/0241863 A1 | 7/2020 | Duvur et al. | |

OTHER PUBLICATIONS

Advisory Action for U.S. Appl. No. 16/261,501, dated Dec. 30, 2020, 7 pages.
Ali J. Fahs et al., "Proximity-Aware Traffic Routing in Distributed Fog Computing Platforms", [Online], pp. 478-487, [Retrieve from Internet on Feb. 12, 2021], <https://ieeexplore.IEEE.org/stamp/stamp.jsp?tp=&arnumber=8752909> (Year: 2019).
Amaral, et al., "Performance Evaluation of Microservices Architectures using Containers", [Online], pp. 27-34, [Retrieved from Internet on Mar. 28, 2020], (Year: 2015).
Andrea Tosatto et al., "Container-based orchestration in cloud: state of the art and challenges", [Online], p. 70-75, [Retrieved from Internet on Jul. 2, 2022], <https://ieeexplore.ieee.org/stamp/stamp.jsp?amumber=7185168> (Year: 2015).
Carleto D., "Docker Enterprise 3.0 Brings Docker Kubernetes Services, New Lifecycle Automation Tools, and More," InfoQ, retrieved from https://www.infoq.com/news/2019/07/docker-enterprise-3/, Jul. 29, 2019, 6 pages.
Cong-Phuoc Hoang et al., "An Extended Virtual Network Functions Manager Architecture to Support Container", [Online], pp. 173-176, [Retrieved from Internet on Feb. 12, 2021], <https://dl.acm.org/doi/pdf/10.1145/3209914.3209934>, (Year: 2018).
Corrected Notice of Allowability for U.S. Appl. No. 16/261,495, dated Jul. 31, 2020, 9 pages.
Corrected Notice of Allowability for U.S. Appl. No. 16/261,504, dated Aug. 12, 2020, 6 pages.
Corrected Notice of Allowability for U.S. Appl. No. 16/261,504, dated Jul. 23, 2020, 6 pages.
Eduardo Saiz et al., "A Cloud Platform for QOE Evaluation: Qoxcloud", [Online], pp. 1-7, [Retrieved from Internet on Jul. 2, 2022], <https://ieeexplore.ieee.org/stamp/stamp.jsp?tp=&arnumber=6858471> (Year: 2014).
Final Office Action, U.S. Appl. No. 16/261,501, dated Oct. 16, 2020, 21 pages.
Hamdani D., "Announcing Docker Enterprise 3.0: Delivering High-Velocity Application Innovation," Docker Blog, retrieved from https://blog.docker.com/2019/04/announcing-docker-enterprise-3-0/, Apr. 30, 2019, 5 pages.
Helgevold T., "Deploying Kubernetes with Zero Downtime," retrieved from https://www.syntaxsuccess.com/viewarticle/deploying-kubernetes-with-zero-downtime, Aug. 3, 2019, 6 pages.
Kugathasan Janarthanan et al., "Policies Based Container Migration Using Cross-Cloud Management Platform", [Online], pp. 1-5, [Retrieved from Internet on Feb. 12, 2021], <https:/lieeexplore.ieee.org/stamp/stamp.jsp?tp=&arnumber=8913336> (Year: 2018).
Non-Final Office Action for U.S. Appl. No. 16/261,501, dated Apr. 3, 2020, 23 pages.
Non-Final Office Action for U.S. Appl. No. 16/261,504, dated Mar. 12, 2020, 12 pages.
Notice of Allowance for U.S. Appl. No. 16/261,495, dated Apr. 3, 2020, 12 pages.
Notice of Allowance for U.S. Appl. No. 16/261,495, dated Jun. 16, 2020, 7 pages.
Notice of Allowance for U.S. Appl. No. 16/261,504, dated Jun. 18, 2020, 15 pages.
Notice of Allowance, U.S. Appl. No. 16/261,501, Feb. 19, 2021, 10 pages.
Notice of Allowance, U.S. Appl. No. 17/225,143, Jul. 15, 2022, 11 pages.
Pahl, C., "Containerization and the PaaS Cloud", [Online], pp. 24-31, [Retrieved from Internet on Mar. 28, 2020], (Year: 2015).
Pilon A., "Docker Enterprise 3.0 Introduces New Tools for Container-Based Applications," TechGenix, retrieved from techgenix.com/docker-enterprise-3/, May 20, 2019, 6 pages.
Steven Van Rossem et al., "Introducing Development Features for Virtualized Network Services", [Online], pp. 184-192, [ Retrieved from Interenton Feb. 12, 2021], <https://ieeexplore.ieee.org/stamp/stamp.jsp?tp=&arnumber=8284055> (Year: 2018).
Tosatto, et al., "Container-based orchestration in cloud: state of the art and challenges," [Online], pp. 70-75, [Retrieved from Interent on Mar. 28, 2020],, (Year: 2015).
Townend, et al., "Improving Data Center Efficiency Through Holistic Scheduling In Kubernetes", [Online], pp. 156-166, [Retrieved from Internet on Mar. 28, 2020], (Year: 2019).

* cited by examiner

CLOUD SERVICES RELEASE ORCHESTRATION

CROSS-REFERENCE TO RELATED APPLICATIONS

This application is a continuation of application Ser. No. 17/225,143, filed Apr. 8, 2021, which is a continuation of application Ser. No. 16/261,501, filed Jan. 29, 2019 (now U.S. Pat. No. 11,003,434 issued May 11, 2021), which are hereby incorporated by reference.

TECHNICAL FIELD

One or more implementations relate to the field of updating software; and more specifically, to the updating of software providing cloud services.

BACKGROUND ART

"Cloud" services provide shared resources, software, and information to computers and other electronic devices upon request. In cloud computing environments, software can be accessible over the internet rather than installed locally on in-house computer systems. Cloud services typically involve over-the-internet provision of dynamically scalable and often virtualized resources. Technological details can be abstracted from the users, who no longer have need for expertise in, or control over, the technology infrastructure "in the cloud" that supports them.

The term "micro-services architecture" refers to an architecture in which each of the micro-services does just one thing efficiently and interacts with others of the micro-services as needed. This contrasts with monolithic architectures in which complex software is run on a single, powerful server. Each of the micro-services may use a different type of hardware and/or software to respectively perform a specialized type of processing different from the types of processing performed by the other micro-services. Moreover, the micro-services architecture allows an application to be decomposed into different ones of these smaller micro-services, improving modularity and making the program code easier to understand, design and test. For example, individual micro-services may be modified (e.g., upgraded, swapped out) without affecting the operation of other micro-services used by the application.

A container-orchestration system (COS) automates deployment, scaling and management of containerized applications (also referred to as containerized software and containerized apps); in other words, it provides a platform for automating deployment, scaling, and operations of application containers across clusters of hosts. For example, Kubernetes is a COS that works with a range of container tools, including Docker. Another example of a COS is Docker Swarm. A container is a self-contained execution environment, such as a Linux execution environment; in other words, a container is a standard unit of software that packages up code and all its dependencies, so the application runs quickly and reliably from one computing environment to another. A container image is used to create one or more containers at runtime. A container image is a lightweight, standalone, executable package of software that includes everything needed to run an application: code, runtime, system tools, system libraries and settings (e.g., a Docker container image becomes a Docker container when it is run on Docker Engine; another container engine is Rkt).

With regard to hardware, a COS may include: 1) nodes (also referred to herein as COS nodes), where a node is a representation of a single machine in a COS cluster, where that single machine can be a physical machine in a datacenter or virtual machine hosted on a cloud provider: 2) clusters (also referred to herein as COS clusters), where a cluster represents a more powerful machine resulting from pooling the resources (CPUs and RAM) of the nodes within the cluster; and 3) persistent volumes (a persistent volume is a file system that can be mounted to the cluster, without being associated with any particular node; while traditional local storage associated to each node is treated as a temporary cache to hold programs and data).

With regard to software, a COS may include: 1) containers (also referred to as COS containers, Docker containers, etc.); 2) pods (also referred to herein as "replicas," COS pods," or "kpods" in a Kubernetes implementation), where a pod is the unit of replication and wraps one or more containers that will share the same resources and local network; 3) deployments, where a deployment manages a pod, including declaring the number of replicas of the pod and monitoring the pods; and 4) ingress, where an ingress refers to a communication channel between a service running in a pod and the outside world, and is typically either an ingress controller, a load balancer, Kube-proxy (a combination of a network proxy and a load balancer). In addition, a COS has support for an abstraction (e.g., a Kubernetes Service) that defines a logical set of pods and a policy by which to access them (sometimes called a micro-service), as well as an API (e.g., Kubernetes Endpoints API) so that the service provided by one of such abstraction can call the service provided by another such abstraction.

In operation, a COS cluster of nodes is formed and a set of one or more persistent volumes is attached to that cluster; and a COS deployment is launched onto the cluster, which deployment causes the spinning up of the declared number of COS pods (where spinning up a COS pod includes executing the containerized application(s) specified in the container image(s) identified for that COS pod) and monitors them.

A COS typically includes a COS controller to control operation of the COS. A COS controller can receive an operation according to configuration information (sometimes referred to as manifests, an "application programming interface (API) object descriptions," or "application configuration information") that describes the desired state of an application in terms of COS constructs.

BRIEF DESCRIPTION OF THE DRAWINGS

The following figures use like reference numbers to refer to like elements. Although the following figures depict various exemplary implementations, alternative implementations are within the spirit and scope of the appended claims. In the drawings:

DETAILED DESCRIPTION

The following description describes a release orchestration mechanism for cloud services. More specifically, the following description includes descriptions of independent, but combinable, implementations of a system for release orchestration and a reusable deployment pipeline for release orchestration.

Exemplary System and Reusable Deployment Pipeline

Figure 1:
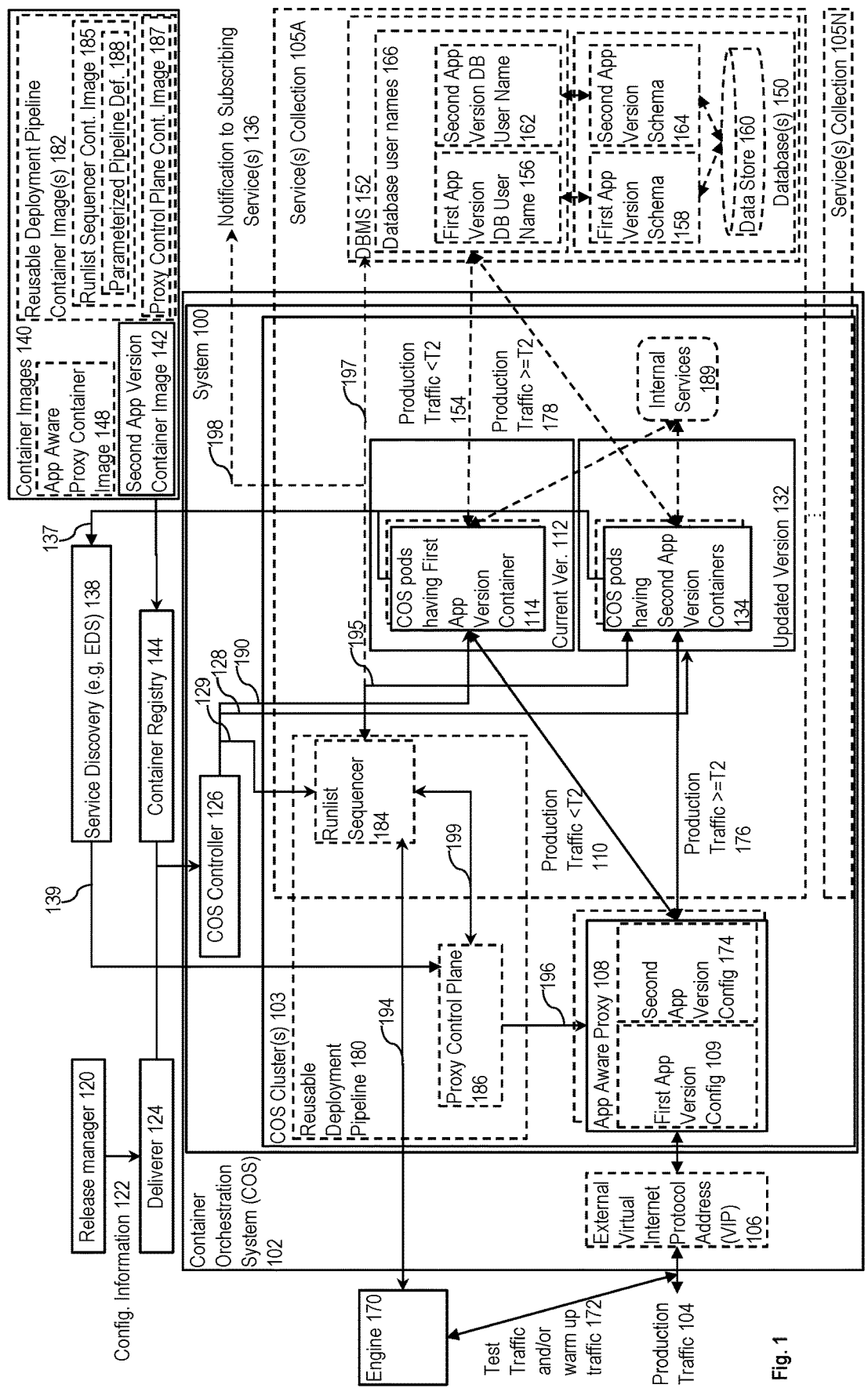
FIG. 1 is a block diagram illustrating a system for release orchestration of cloud services and a reusable deployment pipeline according to some example implementations.

FIG. 1 is a block diagram illustrating a system for release orchestration of cloud services and a reusable deployment pipeline according to some example implementations. FIG. 1 illustrates a Container Orchestration System (COS) 102 (e.g., Kubernetes, Docker Swarm) to facilitate the communication of production traffic 104 (e.g., via an external virtual internet protocol address (VIP) 106 of the COS 102) with a system 100 within the COS 102.

Overview

The system 100 controls the release process of updates to an application (app) that runs in COS pods to provide a cloud service(s). For each release of an update to a current version 112, the system 100 is to: 1) bring up the updated version 132 in new COS pods; 2) control the updating of any underlying state if necessary (e.g., if the service uses a set of one or more database(s) 150, then update the database(s) as necessary); 3) control a validation of the viability of the updated version 132 through control of an engine 170; 4) switch the production traffic 104 from the current version 112 to the updated version 132 (so that the current version 112 and the updated version 132 respectfully become the old version and the current version) if and only after the updated version 132 has been validated (also referred to as a pretesting); and 4) gracefully terminate the now old version.

FIG. 1 also illustrates a reusable deployment pipeline 180 for release orchestration that is independent of, but combinable with, a system such as the system 100. In some implementations, the reusable deployment pipeline operates at the application level and causes the validation of the updated application version before production traffic is sent (causes the generation and transmission of test traffic that mimics production traffic, as well as causes the test traffic to be sent to the updated version while the production traffic continues to be sent to the current version) (sometimes referred to as release trust validation), causes the switch to sending production traffic to the updated version (traffic management), and optionally coordinates immediate post-release activities (e.g., database activities such as dropping custom indexes, deleting tables, etc.).

In some implementations that use the system 100 and the reusable deployment pipeline 180, configuration information 122 causes the COS 102 to spin up containers with the updated version 132, trigger the operation of the reusable deployment pipeline 180 with a set of parameters from the configuration information 122, and use readiness responses from the updated version 132 to control the shutdown of the containers of the old version (what was formerly the current version 112) (including a forced shut down after a time out period as needed) in a manner that provides an opportunity for the old version to finish inflight tasks. The updated version 132 of the app may assist by supporting a mechanism that responds affirmatively to readiness requests from the COS 102 only after the production traffic 104 has been switched to the updated version 132.

Also, for apps that have a stateful database behind them that needs to also be updated to interoperate with the updated version 132, the updated version 132 may assist by implementing leader election, where the leader causes pre-release database preparation to be performed. The update may also be implemented directly by the reusable deployment pipeline 180.

The reusable deployment pipeline 180 may operate at the application level and cause: 1) a validation of the updated version 132 before production traffic 104 is sent to the updated version 132 (e.g., causes the generation and transmission of test traffic that mimics production traffic, as well as causes the test traffic to be sent to the updated version 132 while the production traffic 104 continues to be sent to the current version 112) (sometimes referred to as release trust validation); 2) cause a synchronous or graduated transition to sending the production traffic 104 to the updated version 132 (sometimes referred to as traffic management); and 3) a set of zero or more post-release activities (e.g., database activities such as dropping custom indexes, deleting tables, etc.). In some implementations, the validation is performed by the engine 170 that: 1) operates on demand responsive to the reusable deployment pipeline 180; 2) sends test and/or warm up traffic 172 with a header field value that may be used to route that traffic to the updated version 132; 3) checks the results of that traffic to determine if the updated version 132 is ready for production traffic; and 4) communicates to the reusable deployment pipeline 180 whether the updated version 132 is validated to receive production traffic. The engine 170 may: perform synthetics monitoring (which may include the running of maintenance related, non-app version specific tests on a schedule, but also allow these test to be done on demand); pre-release, version specific testing (which may include the running of app version specific test on demand—namely, during the release process prior to the transition of production traffic to the updated app version); and/or warmup traffic generation (which may include the generation of traffic intended to reduce the response time of the updated app version after the transition to production traffic). The engine 170 may can be implemented as a one or more units. For instance, when implemented as three separate units they may be referred to as: 1) a synthetics monitor (e.g., Thousand Eyes, App Dynamics); 2) a pre-release, version specific tester; and 3) a warmup traffic generator.

The above implementations are advantageous as compared to some conventional systems. For example, a first conventional system using a monolithic application approach (does not use a COS) and update releases have the following drawbacks: 1) validation tests are not run or are run after production traffic is already being sent to the updated version; 2) they require bringing down half the capacity, and thus are scheduled at off-peak hours; 3) they require human interaction and thus do not scale well; 4) production traffic can ping pong between different versions leading to an unsatisfactory service experience; 5) service degradation during the release window is often observable by customers; and 6) in-flight customer activity during a release can be disrupted and transactions fail, especially when the updated version is found to be unstable.

A second conventional system uses a COS (e.g., Kubernetes) that has limited support for releasing updates, and it has the following drawbacks: 1) shuts down the old version as the updated version becomes ready, where being "ready" does not include a validation test of the updated version before sending the production traffic; 2) it uses a rolling update model that suffers from some of the same drawbacks described above (e.g., service experience inconsistencies and incorrect behaviors due to ping ponging); and 3) has no built-in traffic director that can be used for traffic routing and switching.

Thus, the above implementations are advantageous in that they: 1) allow for validation tests to be run before production traffic is sent to the updated version (thus making it "seamless"); 2) ensure, through a set of threshold numbers in the configuration information 122 as described later herein, a configurable number of the COS pods having the second app version containers 134 be ready before switching the production traffic to the updated version 132, which configurable number can be set based on a variety of factors (number of the COS pods having the first app version container 114, expected production traffic volume expected during the release of the updated version) so that the release may be scheduled during peak or off-peak hours; 3) do not require the same level of human interaction and thus scale well; 4) production traffic can be made not to ping pong between different versions (because there is a point in time when the production traffic 104 is switched (see T2 in FIG. 1), rather than routing production traffic to both versions or a rolling update; 5) allow for the update to be less observable or not observable to customers by avoiding service degradation during the release window; and 6) avoid the disruption of in-flight production traffic and the failure of transactions when the updated version turns out to be unstable during a release. Since releases pose significant risk to a service (See 2.2), the above implementations can scale up efficiently, reduce data center costs, and maintain high trust.

Releases can be conducted at any time and are seamless. Implementations may achieve zero-downtime during releases, even when the current and updated versions use different database schema, by relying on the below discussed time windows to maintain data integrity during the periods of version overlap. Furthermore, in addition to release validation and cut over, the above implementations may perform pre-release database preparation and post-release data maintenance actives in those scenarios where the app must query one or more stateful databases when processing traffic. The reusable deployment pipeline enables the release of updates to applications providing cloud services (performs old app version to new app version transition) with trust using containers to enable anytime seamless releases. Thus, the reusable deployment pipeline reduces the time and expense associated with existing techniques for releasing such updates. In one implementation, this is applied to an existing monolith application by containerizing the monolith application and applying the reusable deployment pipeline.

Additional Detail

Before a time T2, the production traffic 104 is being routed by an application (app) aware proxy 108 (e.g., a Layer 7 (also referred to as an L7 or application layer) proxy, which may be implemented using, for example, the open source Envoy Project) to and from (see line 110) the current version 112 (also referred to as the first application (app) version) that runs in a number of COS pods having first app version containers 114. In some implementations, the app aware proxy 108 includes first app version configuration 109 that causes the production traffic 104 to be routed to the current version 112. The first app version is to be replaced by the orchestrated release of the updated version 132 (also referred to as the second app version).

In some implementations, the production traffic 104 causes the application (app) to communicate with the set one or more database(s) 150 (one or more of which may be stateful databases) provided through a database management system (DBMS) 152. Prior to time T2, this communication is with the first app version containers 114 as illustrated by line 154. In some such implementations, the DBMS 152 is configured with a database username that is assigned to the first app version (illustrated as first app version DB user name 156) and a database schema (illustrated as first app version schema 158) for accessing data store 160. In some such implementations, a separate database user name (illustrated as the second app version DB user name 162) is assigned (which includes the creating and preloading of a user name if there is not an existing one that can be assigned) to the second app version, and any required database schema for the second app version (illustrated as second app version schema 164) is also preloaded, for the second app version to use to access the data store 160. While some implementations use different database usernames 166 to separate communications from the different app versions, alternative implementations may use another technique (e.g., inclusion of separate identifiers).

Container image(s) 140, including a second app version container image 142, are registered with a container registry 144 to which the COS controller 126 has access. In some implementations, the container image(s) 140 also include an app aware proxy container image 148 which the COS controller 126 uses to bring up a set of one or more COS pods with app aware proxy containers to implement the app aware proxy 108. In alternative implementations, the app aware proxy 108 may be deployed independently of the second app version, as it can operate independent of the app functionality.

The release process is set in motion by the submission by a release manager 120 (which may be a human and/or an external automated process) of configuration information 122 (also referred to as a manifest) to a deliverer 124 (e.g., a software development platform such as GitHub) for delivery to the COS 102, and more specifically for delivery to the COS's controller 126 (also referred to as the controller, the replication controller, the COS controller, and in the case of Kubernetes, the Kubernetes Controller).

Responsive to the configuration information 122, the COS controller is to access the second app version container image 142 through the container registry 144 to bring up (see line 128) COS pods having second app version containers 134. The COS controller 126 is also to send signals (line 128; referred to as readiness requests, or readiness probe requests in Kubernetes) to the COS pods having the second app version containers 134 to determine whether and when it can cause the COS pods having the first app version containers 114 to shut down (see line 190; which may be done by first instructing each to gracefully shutdown and starting a timer, and then forcing a shutdown of the timer is exceeded).

In implementations in which the production traffic 104 causes the application (app) to communicate with the set of one or more database(s) 150, the second app version container image 142 includes code and database release artifacts (e.g., procedural language/structured query language (PL/SQL) Scripts; database query optimization statistics and/or hints; etc.). The code, when executed within the COS pods having the second app version containers 134, causes them to participate in the election of a leader (e.g., using an exclusive semaphore), and the elected leader then prepares the database(s) 150 by loading the database release artifacts using the second app version DB user name 162. In addition, in implementations where the traffic 172 causes the application (app) to communicate with the set of one or more database(s) 150, the second app version containers 134 communicate with the database(s) 150.

Responsive to the configuration information 122, the COS controller is also: 1) to cause (see line 129) the engine 170 to send test and/or warm up traffic 172 (e.g., communicated via the external virtual internet protocol address (VIP) 106 of the COS 102) with an identifier; and 2) to cause the app aware proxy 108 to use that identifier to route the traffic 172 to and from the second app version containers 134 (e.g., see second app version configuration 174) while continuing to route the production traffic 104 to and from the first app version containers 114. Thus, in some implementations, the app being upgraded supports: 1) a mechanism to indicate when the new version of the app is live and can receive test traffic (e.g., supports health mediation signals to such as liveness request (also referred to as liveness probe requests in Kubernetes); and 2) a mechanism to determine when the transition to routing the production traffic to the new version has occurred (e.g., the app pinging a URL to learn if it is receiving production traffic).

If and when enough of the COS pods having the second app version containers 134 are live and the second app version has been validated, then the app aware proxy 108 at time T2 is configured to transition the routing of the production traffic 104 to the second app version containers 134 (see line 176). Thus, the production traffic 104 continues to be routed to the current version 112 as the transition to the updated version 132 is in progress. However, if and when it is determined to be safe, the production traffic 104 is switched to the updated version 132. In the situation where the result of the test traffic 172 indicates that the second app version has one or more problems and cannot be validated, then the switch is not performed and the production traffic 104 continues to be routed to the current version 112; since the current version 112 is assumed to be stable, there should be no interruption in the handling of the production traffic 104 due to the failure of the second app version to be validated. This is advantageous over conventional systems which switch production traffic over to the updated version without having performed this type of validation because any unexpected errors can result in the interruption of the processing of the production traffic 104. Such an interruption would be visible to customers, and therefore result in a less than optimal customer experience.

In implementations in which the production traffic 104 causes the application (app) to communicate with the set of one or more database(s) 150, after the transition that communication is now between the second app version containers 134 and the database(s) 150 (see line 178).

As previously described, the COS controller 126 is to send signals (line 128) to the COS pods having the second app version containers 134 to determine whether and when it can cause the COS pods having the first app version containers 114 to shut down (line 190). In some implementations, the second app version container image 142 also includes code, that when executed, causes the COS pods having the second app version containers 134 to: 1) determine whether the transition to sending them the production traffic 104 has occurred; and 2) respond affirmatively to readiness requests from the COS controller 126 only after the transition has occurred (see line 128). As compared to conventional systems in which new COS pods would respond to such readiness request irrespective of whether any such validation and transition has occurred, the implementation described herein provides an opportunity for the validation of the updated version 132 to occur by having the COS pods with the second app version containers 134 signal readiness only if and after the validation is successful.

Implementations of the reusable deployment pipeline 180 will now be described. In some implementations, the container image(s) 140 also include a reusable deployment pipeline container image(s) 182 which the COS controller 126 uses to bring up a set of one or more COS pods with reusable deployment pipeline containers to implement the reusable deployment pipeline 180. FIG. 1 also illustrates implementations in which the reusable deployment pipeline 180 is implemented by or replaced with a runlist sequencer 184 (also referred to as a sequencer or release orchestrater) (e.g., implemented with Rundeck or the open source Jenkins Pipeline project, which offers an end-user programmable pipeline specification language and reliable execution capability) and a proxy control plane 186 (e.g., Switchboard, Istio), in which case the container image(s) 140 may include a runlist sequencer container image 185 and a proxy control plane container image 187 which the COS controller 126 may respectively use to bring up a set of one or more COS pods with runlist sequencer containers to implement the runlist sequencer 184 and a set of one or more COS pods with proxy control plane containers to implement the proxy control plane 186. While FIG. 1 illustrates implementations in which the reusable deployment pipeline 180 is implemented by or replaced with a runlist sequencer 184 and a proxy control plane 186, in other implementations the operations attributed to these are integrated into the COS controller 126.

In some implementations, the runlist sequencer container image 185 includes a parameterized pipeline definition 188 that is controlled through a set of one or more parameters provided in the configuration information 122. This allows for a greater level of reusability because one or more of the set of parameters may be changed between updates. Thus, responsive to the configuration information 122, per line 129 the COS controller 126 may also be implemented to determine if there is a reusable deployment pipeline 180 (or runlist sequencer 184) already running that can be used; and if not, to bring one up (e.g., bringing up a COS Pod with a runlist sequencer container based on an identification of a runlist sequencer container image 185 in the configuration information 122). Further, as described in more detail later herein, the COS controller 126 may provide a set of parameters (e.g., including identification information and/or a threshold number) from the configuration information 122 to the reusable deployment pipeline 180 (or the runlist sequencer 184).

In some implementations, the runlist sequencer 184 controls the release steps and the proxy control plane 186 controls the set of one or more app aware proxies 108 to route the test traffic and production traffic to the current version 112 and updated version 132. In some implementations, the runlist sequencer 184: 1) either fails or succeeds (error outs or completes within a relatively short time); 2) runs in a singleton container alongside the updated version 132 and is active only during releases; 3) is implemented such that each step in the runlist sequencer 184 is idempotent; and/or 4) performs error handling, logs, release robustness, manageability, security etc.

When the COS pods having the second app version 134 are brought up, a service discovery service 138 (e.g., Endpoint Discovery Service (EDS) in Envoy, Apache Zoo-Keeper) found in conventional data centers receives from the COS pods having the second app version containers 134 (see line 137) and provides (see line 139) to the reusable deployment pipeline 180 (or the proxy control plane 186): 1) identification information provided through the COS controller 126 receiving the configuration information 122 and bringing up the COS pods having the Second App Version Containers 134; and 2) network information (e.g., IP address(es) and port numbers) for the COS pods having the second app version containers 134. In addition, the service discovery service 138 recognizes when the COS pods having the first app version containers 114 have been shut down (see line 137) and provides notifications of such (see line 139) to the reusable deployment pipeline 180 (or the proxy control plane 186).

The reusable deployment pipeline 180 is to: 1) cause the validation (see line 194) of the updated version 132 using the COS pods having the second app version containers 134 that are live (see line 195) responsive to receiving from the COS controller 126 a set of parameters (see line 129) from the configuration information 122 provided to the COS controller 126; 2) if the second app version is validated, to cause a transition to sending the production traffic 104 to the second app version containers that are Live (traffic management) (see line 196); and 3) optionally cause post-release activities (e.g., database maintenance activities (see line 197) to clean up anything no longer needed since the old app version is no longer being used; sending notifications (see line 198) regarding the status (progress and/or success/failure outcomes) of the update to subscribing services 136 (e.g., to trust and internal monitoring systems, to a reliable system of record for further analysis and corrective action).

As illustrated by line 199, the runlist sequencer 184 and the proxy control plane 186 communicate with each other (e.g., the network information for the COS pods having the second app version containers 134, instructions concerning when to change the routing rules that route the test and/or warmup traffic 172 from the engine 170 and the production traffic 104, and a notification of when all of the COS pods having the first app version containers 114 have been shut down). The runlist sequencer 184 is to: 1) monitor the status (see line 195) of the COS pods having the second app version containers 134; 2) instruct (see line 199) the proxy control plane 186 when to change the routing rules (see line 196) in the app aware proxy 108; 3) cause the initiation of and receive the result of (see line 194) the test and/or warmup traffic 172; and 4) optionally cause any post-release activities (see lines 197 and/or 198).

In addition to the above, the proxy control plane 186, only after the transition has occurred, causes the app aware proxy 108 to reply affirmatively to requests (e.g., configure a routing rule) whether the second app version containers 134 are now receiving the production traffic 104. In some implementations, this is done by causing a URL derived from the identification information in the configuration information 122 to affirmatively respond to pings requesting whether the second app version containers 134 are now receiving the production traffic 104 (according to HTTP, 200=yes and 500=no), wherein code in the second app version container image 142, when executed, causes the second app version containers 134 to use the same identification information to derive the same URL and to ping it to determine whether the transition has occurred). In other words, in addition to causing the switching of the production traffic 104 to the updated version 132, around the same time the runlist sequencer 184 also causes the proxy control plane 186 of the app aware proxy 108 to set an indication to indicate that the production traffic 104 is now switched to being sent to the updated version 132; the updated version 132, responsive to this indication, will then respond to readiness requests from the COS controller 126 in the affirmative. This indication mechanism allows for a first window of time within which the test and/or warm up traffic 172 can be sent to the updated version 132 while the production traffic 104 is still being sent to the current version 112. When the updated version 132 signals ready responsive to requests from the COS controller 126, the COS controller 126 starts the process of shutting down the COS pods having the first app version containers 114. As previously described, this shutting down process may include: 1) instructing the COS pods having the first app version containers 114 to gracefully shutdown; and/or 2) using a set of timers to provide a second window of time to allow the COS pods having the first app version containers 114 to have a chance to complete in-flight execution of long running requests and jobs before being forcibly shut down.

Thus, the: 1) the first time window is created to delay the COS controller 126 from starting, responsive to the COS pods having the second app version containers 134 reaching a point when they would be considered ready in a conventional system, the shutdown process of the COS pods having the first app version containers 114 so as to provide time for the test and/or warmup traffic 172 to be routed to the updated version 132 while the production traffic 104 is being routed to the current version 112; and 2) the second time window is created after cutting over the production traffic 104 from the current version 112 to the updated version 132 so as to provide a reasonable amount of time after the cut over for the current version 112 to process the production traffic 104 that was sent to it. Therefore, there is overlapping execution of the current version 112 and the updated version 132 during the first time window (the current version 112 processing the production traffic 104, and the updated version 132 processing the test and/or warmup traffic 172) and the second time window (the current version 112 processing the production traffic 104 sent to it before the cut over, and the updated version 132 processing the production traffic 104 sent it after the cut over).

In some implementations, the app being updated relies on one or more internal services 189 (e.g., a search service, a message queue service, a cache service), and this is addressed by having the first app version containers 114 and the second app version containers 134 communicate separately with these internal services.

Also, in some implementations, a construct (referred to herein as a service(s) collection) is used to create, organize, and monitor a set of one or more service(s) to be provided. FIG. 1 illustrates the option of having multiple service(s) collection by showing service(s) collections 105A-N. A service(s) collection is a collection of pods (e.g., kpods), and possibly multiple microservices (e.g., Kubernetes services), that each provide one or more service(s). A service(s) collection is a collection in that it: 1) provides multiple instances of the same service and/or microservice through different COS pods; and/or 2) provides different types of services and/or microservices through different COS pods. In some such implementations, the release of the updated version 132 is separately controlled for each such service(s) collection. For example, implementations may support the release of separate configuration information 122 for each service(s) collection 105 by including a service(s) collection ID assigned to each such service(s) collection 105. Additionally or alternatively, implementations may support multiple COSs 102 in different data centers in different geographic locations, and each of the COS controllers 126 of these COSs 102 may: 1) track the service(s) collections IDs of the service(s) collection they are hosting; and 2) receive a broadcasting of the configuration information 122 for each update to each of the service(s) collection, and decide whether to act on each respective configuration information 122 based on whether the service(s) collection ID in that respective configuration information 122 is one assigned to one of the collection(s) services being hosted by that COS 102. Additionally or alternatively, different customers (or groups of customers) may be assigned to different (possibly identical) service(s) collections 105.

By way of example, assume that the app being updated provides a customer relationship management (CRM) service (e.g., Sales Cloud by salesforce.com, Inc.), which relies on internal services 189 (e.g., helper microservices that provide a search service, a cache service, and a message queue (MQ) service) and interacts with the database(s) 150. Also, assume that there may be multiple ones of the service(s) collections 105 that: 1) each include first app version containers, the internal services 189, and the DBMS 152; and 2) provide the CRM service to different customers or groups of customers. For each such service(s) collection, the release manager 120 may submit the configuration information 122 so that the system 100 and/or reusable deployment pipeline 180 attempts to transition that service(s) collection to an updated version of the app (switches to using second app version containers brought up within that service(s) collection). This contrasts with such a CRM service being provided by a self-contained unit (referred to as a Salesforce Point of Deployment (sfPOD) or Salesforce Instance) having all the software and hardware needed to provide the service (e.g., all the application server(s), database server(s), storage, search service etc. and hardware executing them). Thus, while historically the concept of an sfPOD is sometimes thought of as designating physically collocated hardware, each of the service(s) collection 105 can be thought of as a logical sfPOD (also referred to as a logical Salesforce Instance) because the COS 102 is orchestrating the: 1) nodes (also referred to herein as COS nodes), where a node is a representation of a single machine in a COS cluster, where that single machine can be a physical machine in a datacenter or virtual machine hosted on a cloud provider: 2) clusters (also referred to herein as COS clusters 103), where a cluster represents a more powerful machine resulting from pooling the resources (CPUs and RAM) of the nodes within the cluster; and 3) persistent volumes (a persistent volume is a file system that can be mounted to the cluster, without being associated with any particular node; while traditional local storage associated to each node is treated as a temporary cache to hold programs and data).

Control Signals Summary

As described above, some implementations use control signals. In some implementations, these are implemented using HTTP endpoints established using URLs, where the URLs are derived from the IP addresses and port numbers of the second app version containers 134. The COS controller 126 sends to the COS pods having the second app version containers 134: 1) liveness requests (e.g., each of the second app version containers 134 establishes an HTTP endpoint with a URL based on IP address:port/ping.jsp, and the COS controller 126 sends liveness probe requests to each of those endpoints until it responds that second app version container is live); and 2) readiness requests (e.g., each of the second app version containers 134 establishes an HTTP endpoint with a URL based on IP address:port/ready.jsp, and the COS controller 126 sends readiness probe requests to each of those endpoints until it responds that the second app version container is ready).

The COS pods having the second app version containers 134 each: 1) establish the above described HTTP endpoints; 2) derives an HTTP endpoint with a URL based on identification information (e.g., a service(s) collection ID and/or a second app version ID) in the configuration information, which HTTP endpoint is controlled to indicate whether the transition to sending the production traffic to the updated version 132 has occurred); and 3) responds to readiness requests from the COS controller 126 based on pinging the HTTP endpoint and responding negatively until that HTTP endpoint indicates that the production traffic 104 has be switched to the updated version 132.

The reusable deployment pipeline 180 (or the runlist sequencer 184): 1) responsive to receiving the network information for the COS pods having the second app version containers 134 from the service discovery service 138 (in some implementations, via the proxy control plane 186), also sends to the COS pods having the second app version containers 134 liveness requests (e.g., as described above, each of the second app version containers 134 establishes an HTTP endpoint with a URL based on IP address:port/ping.jsp, and the COS controller 126 sends liveness probe requests to each of those endpoints until it responds that second app version container is live); 2) receives from the engine 170 a result of the test and/or warmup traffic 172 sent from the engine 170; 3) controls an indication of whether the production traffic 104 has been transitioned to the updated version 132 (e.g., cause the establishment and controls the response of an HTTP endpoint with a URL based on identification information (e.g., a service(s) collection ID and/or a second app version ID) in the configuration information to indicate whether the transition to sending the production traffic to the updated version 132 has occurred); and 4) receives notifications from the service discovery service 138 that all the COS pods with the first app version containers 114 have been shut down (in some implementations, via the proxy control plane 186).

Thus, while the COS controller 126 in conventional systems uses liveness requests to decide whether to restart a COS pod (e.g., it failed to spin up), the liveness requests are being reused for a different purpose by the reusable deployment pipeline 180 (or the runlist sequencer 184)—as in an input in deciding when to initiate the sending of the test and warmup traffic 172. Also, while the COS controller 126 in conventional systems may use readiness requests to load balance between the old and new versions during a release window, the reusable deployment pipeline 180 (or the runlist sequencer 184 and the proxy control plane 186) and the app aware proxy 108 controls when: 1) the test and/or warm up traffic 172 is to be sent to the updated version 132; and 2) when and whether the production traffic 104 is to be sent to the updated version 132.

Exemplary Configuration Information

Depending on the implementation, the configuration information 122 may be a declarative description that identifies: 1) the shape of the deployment (number of containers, memory, CPUs etc.) of the updated version 132; and 2) a set of parameters for the reusable deployment pipeline 180 (or the parametrized pipeline definition 188 in the runlist sequencer 184, which pipeline definition identifies the release steps that need to be executed to bring up the updated version 132 and cut over from current version 112 to the updated version 132).

More specifically, the configuration information 122 may include: 1) an identifier of the second app version container image 142; 2) a number of COS pods; 3) the set of parameters including identification information (e.g., a service(s) collection ID and a second app version ID) and a set of one or more threshold numbers); 4) a time period for the second window; 5) optionally DBMS Connection Information for the first app version and the second app version (e.g., database credentials (e.g., Usernames and Passwords) and a database instance name); and 5) optionally an identifier of the reusable deployment pipeline container image(s) 182 (e.g., the runlist sequencer container image 185). Table 1 below illustrates exemplary content of the configuration information 122 and how each piece is used by the COS controller 126, the updated version 132, and the reusable deployment pipeline 180 (the proxy control plane 186 and the runlist sequencer 184).

TABLE 1

| Items in the Configuration Information 122 | How they are used by the COS Controller 126 | How they are used by the Updated Version 132 | How they are used by the proxy control plane 186 | How they are used by the runlist sequencer 184 |
|---|---|---|---|---|
| Identifier of the second app version container image 142 | Uses to access the container image to spin up | Not used | Not used | Not used |
| A number of COS pods (replicas) | Uses to know how many to spin up | Not used | Not used | Not used |
| Identification information (e.g., a service(s) collection ID and a second app version ID) | Provides to the updated version 132 and the runlist sequencer | Provides to the service discovery service 138 for delivery to the proxy control plane 186, along with IP addresses and port numbers, of the COS pods having the second app version containers 134; Uses to derive a URL that it pings until it indicates that the production traffic 104 has been switched to the updated version 132 | Provides to the runlist sequencer 184 along with the IP address and port numbers; Uses the IP addresses and port numbers to configure the routing of traffic by the app aware proxy 108; Uses to configure and control a routing rule in the app aware proxy 108, which rule replies whether the updated version 132 is processing the production traffic 104 (e.g., uses to cause the derivation of a URL and the establishment of an HTTP endpoint for that URL, which is controlled to return 500 or 200 responsive to an HTTP request to the URL based on whether the transition to sending the production traffic 104 to the updated version 132 has occurred) | Part of the set of parameters. Uses to subscribe to the proxy control plane 186 to receive the IP addresses and port numbers of the COS pods having the second app version containers 134 |
| A set of one or more threshold numbers (lower if off peak hours, set relative to number of COS pods in the deployment) | Provides to the runlist sequencer 184 | Not used | Not used | Part of the set of parameters. Based on the receipt of the IP addresses and port numbers, uses to determine if enough of the COS pods having the second app version containers 134 have been |

TABLE 1-continued

| Items in the Configuration Information 122 | How they are used by the COS Controller 126 | How they are used by the Updated Version 132 | How they are used by the proxy control plane 186 | How they are used by the runlist sequencer 184 |
|---|---|---|---|---|
| | | | | brought up to start sending liveness probes requests; Uses to determine if enough of the COS pods having the second app version containers 134 have responded positively to liveness probes received to initiate the sending of the test and/or warm up traffic 172 |
| An amount of time to wait before a forced kill of COS pods having the first app version containers 114 | Uses to provide time for inflight tasks to complete | No used | Not used | Not used |
| Optionally, DBMS Connection Information for the first app version and the second app version (e.g., database credentials (e.g., Usernames and Passwords) and a database instance name); | Provides the DBMS Connection Information for the second app version to the updated version 132; Provides the DBMS connection information for the first app version and the second app version to the runlist sequencer 184 | Uses the DBMS Connection Information for the second app version to access the database(s) 150 | Not used | Part of the set of parameters. Provides the DBMS Connection Information for the first app version and the second app version for database maintenance |
| Optionally an identifier of the reusable deployment pipeline container image(s) 182 | Compares the identifier with the identifier (and in some cases the set of parameters) from the prior config. info. 122, and if it differs it spins up a new runlist sequencer 184. | Not used | Not used | Not used |

Exemplary Operation

Figure 2A:
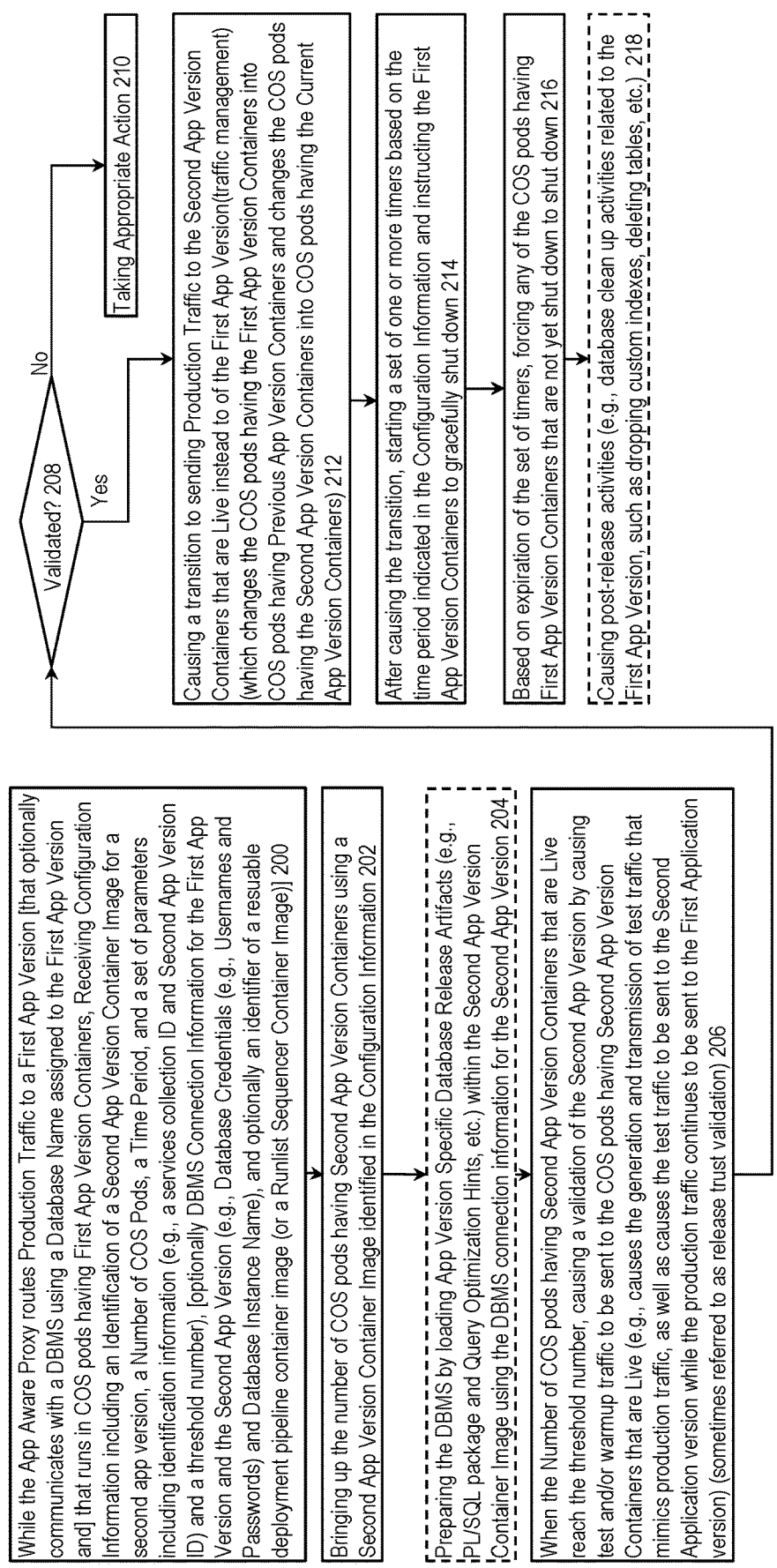
FIG. 2A is a flow diagram illustrating a method for a system for release orchestration according to some example implementations.

FIG. 2A is a flow diagram illustrating a method for a system for release orchestration according to some example implementations. While an app aware proxy routes production traffic to a first application (app) version that runs in a plurality of container orchestration system (COS) pods having first app version containers, receiving in block 200 configuration information including an identification of a second app version container image for a second app version, a number of COS pods, a time period, and a set of parameters including identification information and a threshold number. The second app version is an updated version of the first app version. From block 200, control passes to block 202.

Block 202 shows, using the second app version container image identified in the configuration information, the bringing up of COS pods having second app version containers until their number meets the number of COS pods from the configuration information. From block 202, control passes to block 204.

If the first application (app) version is to communicate (query) with a database management system (DBMS) using a database name assigned to the first app version, then: 1) the configuration information includes DBMS connection information for the first app version and the second app version; and 2) optional block 204 shows the preparing of the DBMS by loading app version specific database release artifacts within the second app version container image using the DBMS connection information for the second app version. In some implementations, the DBMS connection information for the second app version was previously preloaded into the DBMS, and the second app version container image was previously registered with the container registry. In some implementations, the DBMS connection information for the first app version and the second app version each include database credentials, which include: 1) database usernames and passwords; and 2) optionally a database instance name. In some implementations, the app version specific database release artifacts include a PL/SQL package and a set or one or more query optimization hints. From block 204, control passes to block 206.

Block 206 shows that when the threshold number of the COS pods having the second app version containers are live, the causing of a validation of the second app version by causing test and/or warmup traffic to be sent to the COS pods having the second app version containers that are live. In some implementations, this includes causing: 1) the generation and transmission of test traffic that mimics production traffic; and 2) the test traffic to be sent to the second application version while the production traffic continues to be sent to the first application version. From block 206, control passes to block 208.

In block 208, it is determined whether the result of the test and/or warmup traffic indicates that the second app version has been validated. If not, control passes to block 210 where appropriate action is taken (e.g., terminating the release of the update and any notifying subscribing services of the failure). Otherwise, control passes to block 212.

Block 212 shows the causing of a transition to sending production traffic to the second app version containers that are live instead of to the first app version. From block 212, control passes to block 214.

Block 214 shows that the method then starts a set of one or more timers based on the time period indicated in the configuration information and instructs the first app version containers to gracefully shut down. From block 214, control passes to block 216. The first app version containers shut down when there is no more work to do (they shut themselves down) or the configured timeout is exceeded. We may configure this timeout in some implementations to be relatively long so that relatively long running work may be completed.

In block 216, if based on expiration of the set of timers, any of the COS pods having the first app version containers that are not yet shut down are forced to shut down. From block 216, control passes to block 218.

Optional block 218 shows the method causing a set of post-release activities (e.g., database cleanup activities related to the first app version, such as dropping custom indexes, deleting tables, etc.).

Figure 2B:
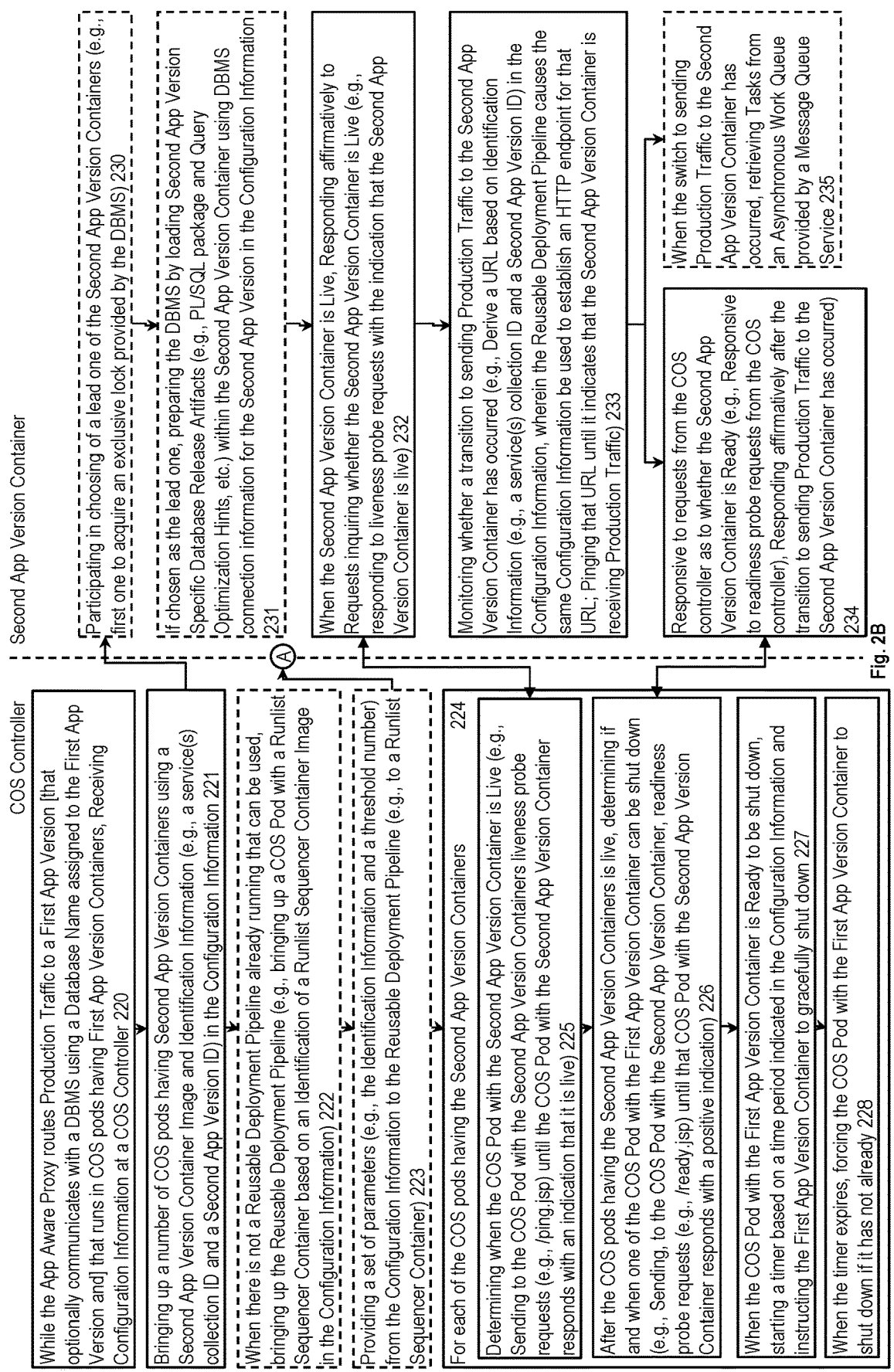
FIG. 2B is a flow diagram illustrating a method for a COS controller and second app version containers according to some example implementations.

FIG. 2B is a flow diagram illustrating a method for a COS controller and second app version containers according to some example implementations. In block 220, while an app aware proxy routes production traffic to a first application (app) version that runs in a plurality of container orchestration system (COS) pods having first app version containers, the COS controller receives configuration information. From block 220, control passes to block 221.

Block 221 shows the COS controller bringing up a number of COS pods having second app version containers using a second app version container image and identification information in the configuration information. In some implementations, the second app version container image was previously registered with the container registry. From block 221, control passes to block 222 and 230.

Optional block 222 shows that when there is not a reusable deployment pipeline already running that can be used, the COS controller brings up a reusable deployment pipeline. In some implementations, this includes the COS controller bringing up a COS pod with a runlist sequencer container based on a runlist sequencer container image identified in the configuration information. From block 222, control passes to block 223.

Optional block 223 shows the COS controller providing a set of parameters from the configuration information to a reusable deployment pipeline. As previously described, the reusable deployment pipeline is responsible for causing a transition to sending production traffic to the second app version containers instead of the first app version after the second app version containers have been validated. From block 223, control passes to circled A and block 224.

Block 224 illustrates that the COS controller performs blocks 225, 226, 227, and 228 for each of the COS pods having the second app version containers.

In block 225, the COS controller, when the second app version container is live, responds affirmatively to requests from the COS controller determines when the COS pod with the second app version Container is live. In some implementations, this is performed by the COS controller sending to the COS pod with the second app version container liveness requests until the COS pod with the second app version container responds with an indication that it is live. From block 225, control passes to block 226.

Block 226 shows that after the COS pod having the second app version container is live, determining if and when one of the COS pods with the first app version container can be shut down. In some implementations, this is performed by the COS controller sending to the COS pod with the second app version container readiness requests until a positive indication is returned. From block 226, control passes to block 227.

In block 227, when the COS pod with the first app version container is ready to be shut down, the COS controller starts a timer based on a time period indicated in the configuration information and instructs the first app version container to gracefully shut down. From block 227, control passes to block 228.

In block 228, the COS controller, when the timer expires, forces the COS pod with the first app version container to shut down if it has not already.

If the first application (app) version communicates with a database management system (DBMS), then optional blocks 230 and 231 are performed. Otherwise, control passes from block 221 to block 232.

In optional block 230, each of the second app version containers participates in choosing of a lead one of the second app version containers. From block 230, control passes to block 231.

Optional block 231 shows that the lead one of the second app version containers prepares the DBMS by loading second app version specific database release artifacts within the second app version container using the DBMS connection information for the second app version in the configuration information. In some implementations, the DBMS connection information for the second app version was previously preloaded into the DBMS. In some implementations, the DBMS connection information for the first app version and the second app version each include database credentials, which include: 1) database usernames and passwords; and 2) optionally a database instance name. In some implementations, the app version specific database release artifacts include a PL/SQL package and a set of one or more query optimization hints. From block 231, control passes to block 232.

Block 232 shows that each of the second app version containers, when it is live, responds affirmatively to requests inquiring whether the second app version container is live. Thus, in some implementations block 225 and block 232 illustrate control signals between the COS controller and the second app version containers. From block 232, control passes to block 233.

In block 233, each of the second app version containers monitors whether the transition to sending production traffic to the second app version container has occurred. In some implementations, this is performed: 1) deriving a URL based on the identification information (e.g., a services collection identifier and/or a second app version identifier) in the configuration information; and 2) pinging that URL until it indicates that the second app version container is receiving production traffic. Once it has, control passes to block 234 and block 235.

Block 234 shows that responsive to requests from the COS controller as to whether the second app version container is ready, the second app version container responds affirmatively after determining that the transition to sending production traffic to the second app version container has occurred. Thus, in some implementations block 226 and block 234 illustrate control signals between the COS controller and the second app version containers.

Optional block 235 shows that each of the second app version containers, after determining that the switch to sending production traffic to the second app version has occurred, starts retrieving tasks from an asynchronous work queue provided by a message queue service.

Figure 2C:
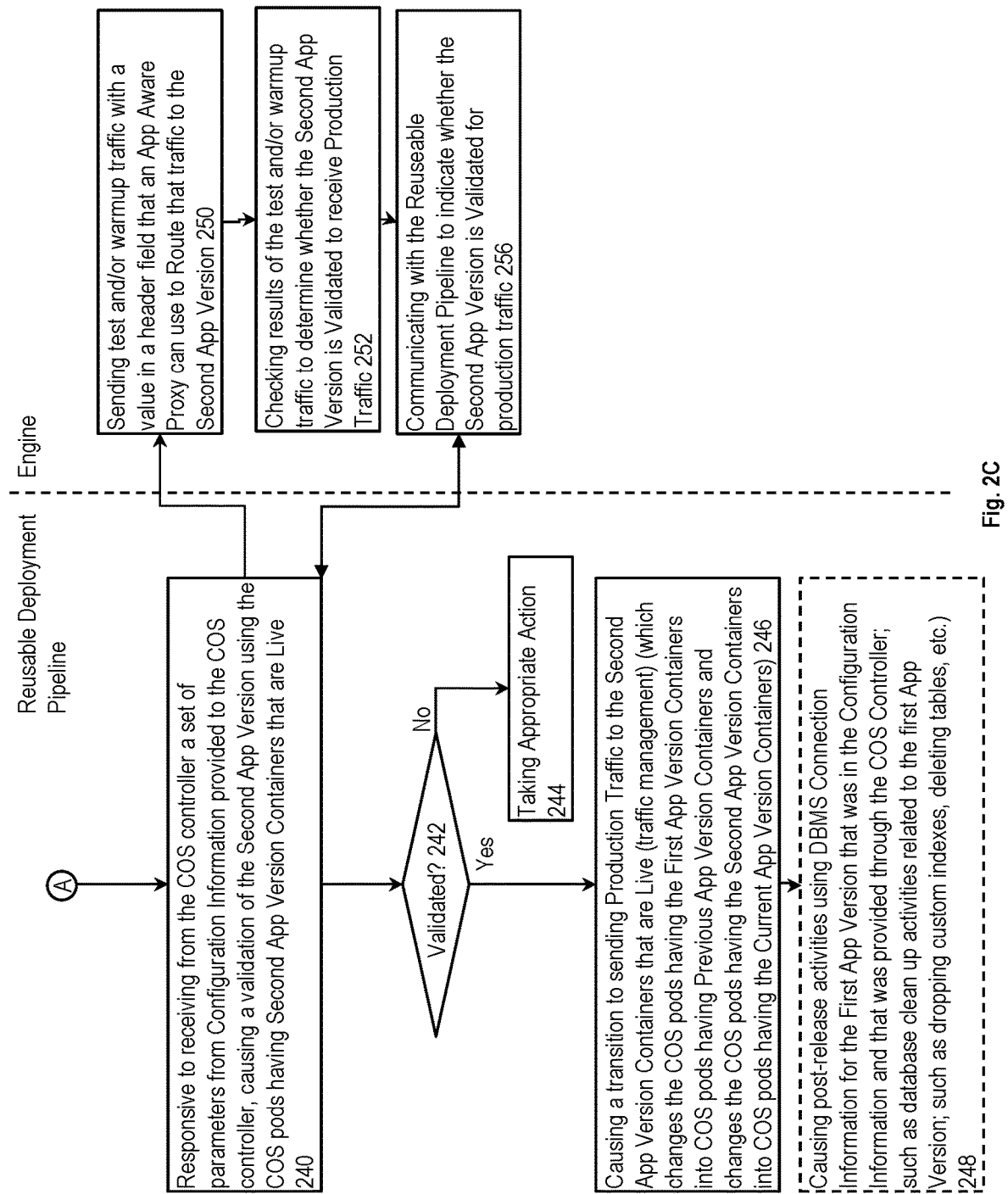
FIG. 2C is a flow diagram illustrating a method for a reusable deployment pipeline and an engine according to some example implementations.

FIG. 2C is a flow diagram illustrating a method for a reusable deployment pipeline and an engine according to some example implementations. Block 240 shows that, responsive to receiving from a COS controller a set of parameters from configuration information provided to the COS controller while an app aware proxy routes production traffic to a first application (app) version and that runs in container orchestration system (COS) pods having first app version containers, the reusable deployment pipeline causes a validation of a second app version using COS pods having second app version containers that are now live after having been brought up by the COS controller responsive to the provision of the configuration information. The configuration information having been provided to cause a transition to the second app version which is an update to the first app version. From block 240, control passes to block 242 and 250.

In block 242, it is determined whether the second app version has been validated. If not, control passes to block 244 where appropriate action is taken (e.g., terminating the release of the update and any notifying subscribing services of the failure). Otherwise, control passes to block 246.

Block 246 shows that after the validation, the reusable deployment pipeline causes the transition to sending production traffic to the second app version containers that are determined to be live instead of to the first app version containers. From block 246, control passes to block 248.

In optional block 248, the reusable deployment pipeline causes post-release activities using DBMS connection information for the first app version that was in the configuration information and that was provided through the COS controller.

In block 250, the engine sends test and/or warmup traffic with a value in a header field that an app aware proxy can use to route that traffic to the second app version. Thus, in some implementations block 240 and block 250 illustrate control signals between the reusable deployment pipeline and the engine. From block 250, control passes to block 252.

Block 252 shows that the engine checks the result of the test and/or warmup traffic to determine whether the second app version is validated to receive production traffic. From block 252, control passes to block 256.

In block 256, the engine communicates with the reusable deployment pipeline to indicate whether the second app version is validated for production traffic.

Figure 2D:
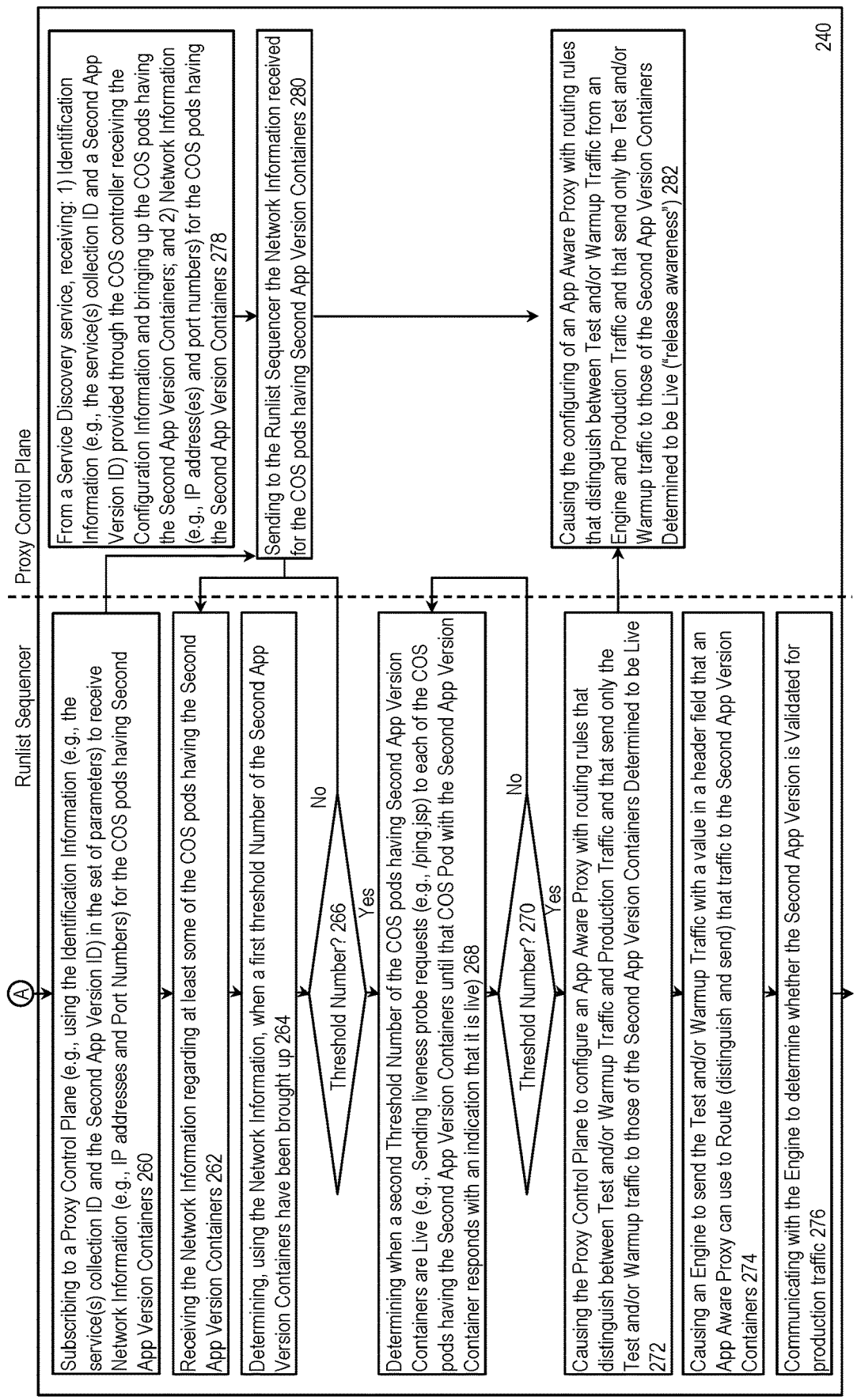
FIG. 2D is a flow diagram illustrating a first part of a method for a runlist sequencer and a proxy control plane according to some example implementations.

FIG. 2D is a flow diagram illustrating a first part of a method for a runlist sequencer and a proxy control plane according to some example implementations. FIG. 2D shows an exploded version of block 240 according to some implementations.

In block 260, the runlist sequencer subscribes, using identification information in the set of parameters, to a proxy control plane to receive network information for the COS pods having the second app version containers. From block 260, control passes to block 262 and 280.

In block 262, the runlist sequencer receives from the proxy control plane the network information regarding at least some of the COS pods having the second app version containers. From block 262, control passes to block 264.

In block 264, the runlist sequencer determines, using the network information, when a first threshold number of the COS pods having the second app version containers have been brought up by the COS controller. From block 264, control passes to block 266.

In block 266, it is determined whether the first threshold number has been met. If not, control passes back to block 262. Otherwise, control passes to block 268.

In block 268, the runlist sequencer determines when a second threshold number (which may be the same or different than the first threshold number) of the COS pods having the second app version containers are live. In some implementations, this includes sending liveness requests to each of the COS pods having the second app version containers until that COS pod with the second app version container responds with an indication that it is live. From block 268, control passes to block 270.

In block 270, it is determined whether the second threshold number has been met. If not, control passes back to block 268. Otherwise, control passes to block 272.

In block 272, the runlist sequencer causes the proxy control plane to configure the app aware proxy with routing rules that distinguish between test traffic and production traffic and that send only the test traffic to those of the second app version containers determined to be live. From block 272, control passes to block 274 and to block 282.

In block 274, the runlist sequencer causes the engine to send the test and/or warmup traffic with a value in a header field that the app aware proxy can use to route that traffic to the second app version containers that are live. From block 274, control passes to block 276.

In block 276, the runlist sequencer communicates with the engine to determine whether the second app version is validated for production traffic. From block 276, control passes to block 242.

In block 278, the proxy control pane receives from a service discovery service both: 1) the identification information provided through the COS controller receiving the configuration information and bringing up the COS pods having the second app version containers; and 2) the network information for the COS pods having the second app version containers. In some embodiments, the network information includes internet protocol (IP) addresses and port numbers for the second app version containers. From block 278, control passes to block 280.

In block 280, the proxy control pane sends to the runlist sequencer the network information for the COS pods having the second app version containers. From block 280, control passes to block 282.

In block 282, the proxy control pane causes the configuring of the app aware proxy with routing rules that distinguish between test and/or warmup traffic and production traffic and that send only the test and/or warmup traffic to those of the second app version containers determined to be live. This is sometimes referred to as "release awareness."

Figure 2E:
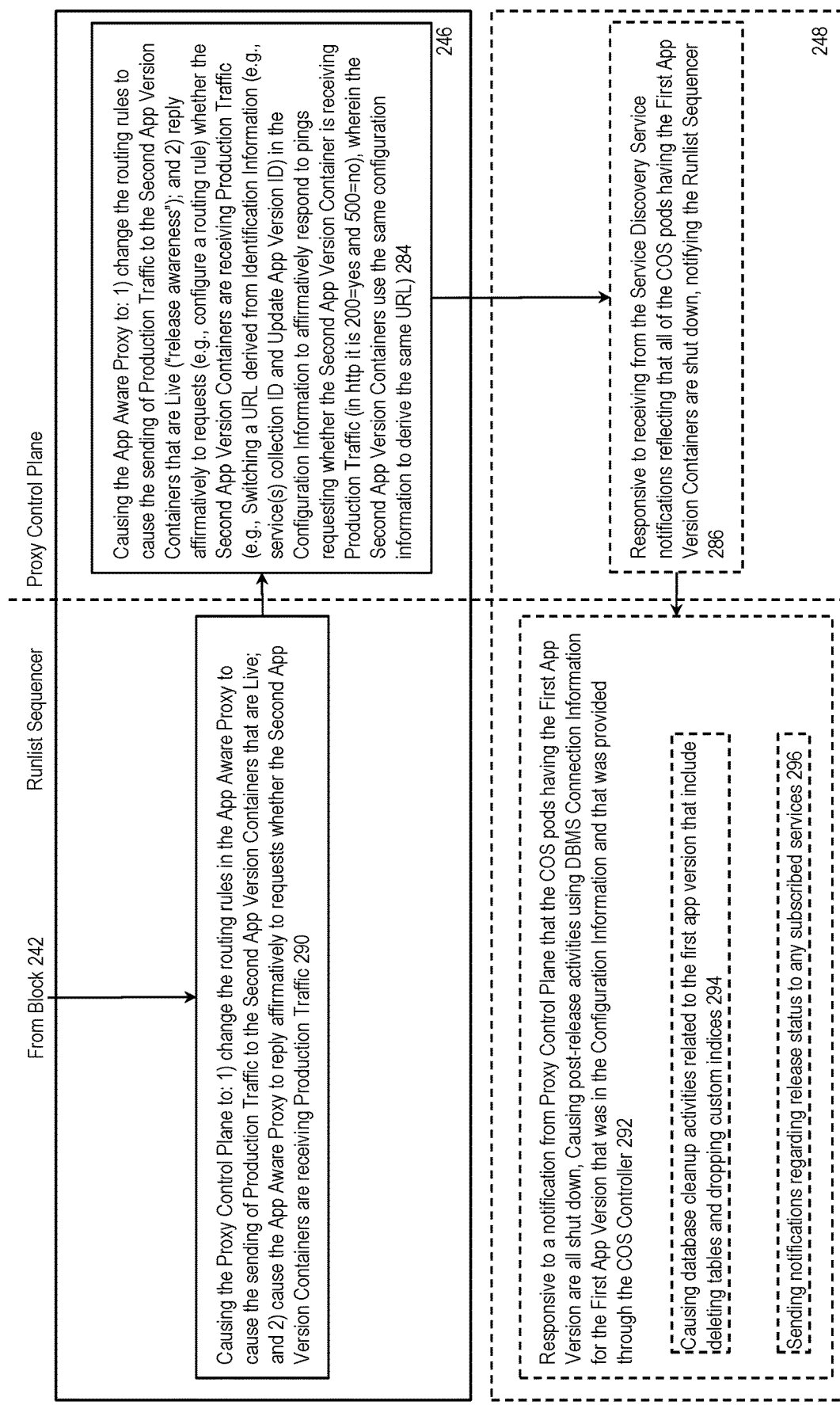
FIG. 2E is a flow diagram illustrating a second part of a method for a runlist sequencer and a proxy control plane according to some example implementations.

FIG. 2E is a flow diagram illustrating a second part of a method for a runlist sequencer and a proxy control plane according to some example implementations. FIG. 2E shows an exploded version of block 246 and block 248 according to some implementations.

Block 242 includes blocks 290 and 284. In block 290, the runlist sequencer causes the proxy control plane to: 1) change the routing rules in the app aware proxy to cause the sending of production traffic to the COS pods having the second app version containers that are live; and 2) cause the app aware proxy to reply affirmatively to requests whether the second app version containers are receiving production traffic. From block 290, control passes to block 284.

In block 284, the proxy control plane causes the app aware proxy to: 1) change the routing rules to cause the sending of production traffic to the COS pods having the second app version containers that are live; and 2) reply affirmatively to requests whether the second app version containers are receiving production traffic. In some implementations, this latter operation is performed by switching an HTTP endpoint with a URL derived from identification information (e.g., service(s) collection ID and/or Update App Version ID) in the configuration information to affirmatively respond to pings requesting whether the second app version containers are receiving production traffic (in HTTP, 200=yes and 500=no); and the second app version containers use the same configuration information to derive the same URL and ping that HTTP endpoint). From block 284, control passes to optional block 248 (and more specifically, to optional block 286 within block 248).

In block 286, the proxy control plane, responsive to receiving from the service discovery service notifications reflecting that all the COS pods having the first app version containers are shut down, notifies the runlist sequencer. From block 284, control passes to optional block 292 within block 248

In block 292, responsive to a notification from proxy control plane that the COS pods having the first app version are all shut down, the runlist sequencer causes post-release activities using DBMS Connection Information for the first app version that was in the configuration information and that was provided through the COS Controller. By way of examples, block 292 may include: 1) causing database cleanup activities (e.g., by triggering a maintenance script in an engine) related to the first app version, such as deleting tables and dropping custom indices (block 294); and 2) sending notifications regarding the status of the release to any subscribed services (block 296).

Exemplary Implementations

A "reference" refers to a piece of data useable to locate a data structure and may be implemented a variety of ways (e.g., a pointer, an index, a handle, a key, an identifier, etc.)

Receipt of data by the system may occur differently in different implementations (e.g., it may be pushed to the system (often referred to as a push model), pulled by the system (often referred to as a pull model), etc.)

The term "user" is a generic term referring to an entity (e.g., an individual person) using a system and/or service. A multi-tenant architecture provides each tenant with a dedicated share of a software instance and the ability (typically) to input tenant specific data for user management, tenant-specific functionality, configuration, customizations, non-functional properties, associated applications, etc. Multi-tenancy contrasts with multi-instance architectures, where separate software instances operate on behalf of different tenants. A tenant includes a group of users who share a common access with specific privileges to a software instance providing a service. A tenant may be an organization (e.g., a company, department within a company, etc.). A tenant may have one or more roles relative to a system and/or service. For example, in the context of a customer relationship management (CRM) system or service, a tenant may be a vendor using the CRM system or service to manage information the tenant has regarding one or more customers of the vendor. As another example, in the context of Data as a Service (DAAS), one set of tenants may be vendors providing data and another set of tenants may be customers of different ones or all the vendors' data. As another example, in the context of Platform as a Service (PAAS), one set of tenants may be third party application developers providing applications/services and another set of tenants may be customers of different ones or all the third-party application developers. A user may have one or more roles relative to a system and/or service. To provide some examples, a user may be a representative (sometimes referred to as an "end user") of a tenant (e.g., a vendor or customer), a representative (e.g., an administrator) of the company providing the system and/or service, and/or a representative (e.g., a programmer) of a third-party application developer that is creating and maintaining an application(s) on a Platform as a Service (PAAS).

Electronic Device and Machine-Readable Media

One or more parts of the above implementations may include software and/or a combination of software and hardware. An electronic device (also referred to as a computing device, computer, etc.) includes hardware and software, such as a set of one or more processors coupled to one or more machine-readable storage media (e.g., magnetic disks, optical disks, read only memory (ROM), Flash memory, phase change memory, solid state drives (SSDs)) to store code (which is composed of software instructions and which is sometimes referred to as computer program code or a computer program) for execution on the set of processors and/or to store data. For instance, an electronic device may include non-volatile memory (with slower read/write times, e.g., magnetic disks, optical disks, read only memory (ROM), Flash memory, phase change memory, SSDs) and volatile memory (e.g., dynamic random access memory (DRAM), static random access memory (SRAM)), where the non-volatile memory persists code/data even when the electronic device is turned off or when power is otherwise removed, and the electronic device copies that part of the code that is to be executed by the set of processors of that electronic device from the non-volatile memory into the volatile memory of that electronic device during operation because volatile memory typically has faster read/write times. As another example, an electronic device may include a non-volatile memory (e.g., phase change memory) that persists code/data when the electronic device is turned off, and that has sufficiently fast read/write times such that, rather than copying the part of the code/data to be executed into volatile memory, the code/data may be provided directly to the set of processors (e.g., loaded into a cache of the set of processors); in other words, this non-volatile memory operates as both long term storage and main memory, and thus the electronic device may have no or only a small amount of volatile memory for main memory. In addition to storing code and/or data on machine-readable storage media, typical electronic devices can transmit code and/or data over one or more machine-readable transmission media (also called a carrier) (e.g., electrical, optical, radio, acoustical or other form of propagated signals—such as carrier waves, infrared signals). For instance, typical electronic devices also include a set of one or more physical network interface(s) to establish network connections (to transmit and/or receive code and/or data using propagating signals) with other electronic devices. Thus, an electronic device may store and transmit (internally and/or with other electronic devices over a network) code and/or data with one or more machine-readable media (also referred to as computer-readable media).

Electronic devices are used for a variety of purposes. For example, an electronic device (sometimes referred to as a server electronic device) may execute code that cause it to operate as one or more servers used to provide a service to another electronic device(s) (sometimes referred to as a client electronic device, a client computing device, or a client device) that executes client software (sometimes referred to as client code or an end user client) to communicate with the service. The server and client electronic devices may be operated by users respectively in the roles of administrator (also known as an administrative user) and end user.

Figure 3B:
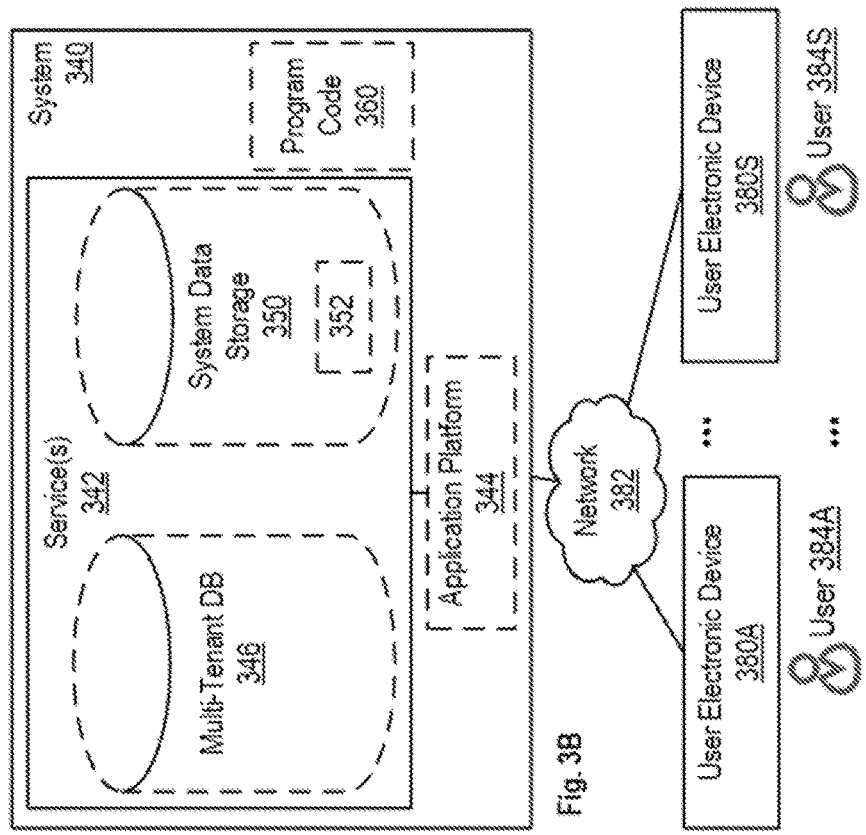
FIG. 3B is a block diagram of an environment where the above discussed release orchestration technique may be used, according to some implementations.
Figure 3A:
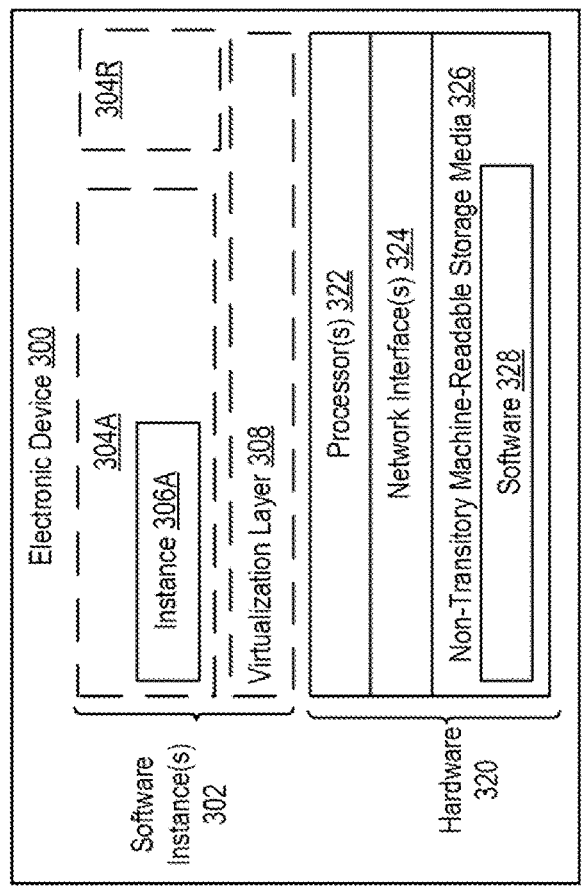
FIG. 3A is a block diagram illustrating an electronic device according to some example implementations.

FIG. 3A is a block diagram illustrating an electronic device 300 according to some example implementations. FIG. 3A includes hardware 320 comprising a set of one or more processor(s) 322, a set of one or more network interfaces 324 (wireless and/or wired), and non-transitory machine-readable storage media 326 having stored therein software 328 (which includes instructions executable by the set of one or more processor(s) 322). Each of the previously described end user clients and the above described cloud service may be implemented in one or more electronic devices 300. In one implementation: 1) each of the end user clients is implemented in a separate one of the electronic devices 300 (e.g., in user electronic devices operated by users where the software 328 represents the software to implement end user clients to interface with the above described cloud service (e.g., a web browser, a native client, a portal, a command-line interface, and/or an application program interface (API) based upon protocols such as Simple Object Access Protocol (SOAP), Representational State Transfer (REST), etc.)); 2) the above describe cloud service is implemented in a separate set of one or more of the electronic devices 300 (e.g., a set of one or more server electronic devices where the software 328 represents the software to implement the above described cloud service); and 3) in operation, the electronic devices implementing the end user clients and the above described cloud service would be communicatively coupled (e.g., by a network) and would establish between them (or through one or more other layers) connections for submitting requests to the above described cloud service and returning responses to the end user clients. Other configurations of electronic devices may be used in other implementations (e.g., an implementation in which the end user client and the service are implemented on a single electronic device 300).

In electronic devices that use compute virtualization, the set of one or more processor(s) 322 typically execute software to instantiate a virtualization layer 308 and software container(s) 304A-R (e.g., with operating system-level virtualization, the virtualization layer 308 represents the kernel of an operating system (or a shim executing on a base operating system) that allows for the creation of multiple software containers 304A-R (representing separate user space instances and also called virtualization engines, virtual private servers, or jails) that may each be used to execute a set of one or more applications; with full virtualization, the virtualization layer 308 represents a hypervisor (sometimes referred to as a virtual machine monitor (VMM)) or a hypervisor executing on top of a host operating system, and the software containers 304A-R each represent a tightly isolated form of a software container called a virtual machine that is run by the hypervisor and may include a guest operating system; with para-virtualization, an operating system or application running with a virtual machine may be aware of the presence of virtualization for optimization purposes). Again, in electronic devices where compute virtualization is used, during operation an instance of the software 328 (illustrated as instance 306A) is executed within the software container 304A on the virtualization layer 308. In electronic devices where compute virtualization is not used, the instance 306A on top of a host operating system is executed on the "bare metal" electronic device 300. The instantiation of the instance 306A, as well as the virtualization layer 308 and software containers 304A-R if implemented, are collectively referred to as software instance(s) 302.

Alternative implementations of an electronic device may have numerous variations from that described above. For example, customized hardware and/or accelerators might also be used in an electronic device.

Exemplary Environment

FIG. 3B is a block diagram of an environment where the above discussed release orchestration technique may be used, according to some implementations. A system 340 includes hardware (a set of one or more electronic devices) and software to provide service(s) 342. The system 340 is coupled to user electronic devices 380A-S over a network 382. The service(s) 342 may be on-demand services that are made available to one or more of the users 384A-S working for one or more other organizations (sometimes referred to as outside users) so that those organizations do not need to necessarily be concerned with building and/or maintaining a system, but instead makes use of the service(s) 342 when needed (e.g., on the demand of the users 384A-S). The service(s) 342 may communicate with each other and/or with one or more of the user electronic devices 380A-S via one or more Application Programming Interface(s) (APIs) (e.g., a Representational State Transfer (REST) API). The user electronic devices 380A-S are operated by users 384A-S.

The application(s) providing one or more of the service(s) 342 are updated from using a current version to an updated version using the above discussed release orchestration technique. Thus, the system 340 includes at least one instance of the COS 102 of FIG. 1A.

The system 340 may be implemented in a single data center or span multiple data centers. In some implementations, at least one instance of the COS 102 is implemented in each of these one or more data center. In the case of multiple instances of the COS 102 different implementations may handle the distribution of the configuration information 122 to the appropriate instance of the COS 102 (e.g., broadcast the configuration information 122 to each instance of the COS 102, and the instances of the COS 102 determine which is the instance to process the configuration information 122 based upon an identifier in the configuration information 122; send the delivery the manifest only to the instance of the COS 102 that is to operate on that the configuration information 122, etc.). The service discovery service 138 is typically provided by the data center.

The service(s) 342, including the one or more services provided by application(s) that are updated using the above discussed release orchestration technique, include a customer relationship management (CRM) service (e.g., Sales Cloud by salesforce.com, Inc.), a contracts/proposals/quotes service (e.g., Salesforce CPQ by salesforce.com, Inc.), a customer support service (e.g., Service Cloud and Field Service Lightning by salesforce.com, Inc.), a marketing service (e.g., Marketing Cloud, Salesforce DMP, and Pardot by salesforce.com, Inc.), a commerce service (e.g., Commerce Cloud Digital, Commerce Cloud Order Management, and Commerce Cloud Store by salesforce.com, Inc.), communication with external business data sources (e.g., Salesforce Connect by salesforce.com, Inc.), a productivity service (e.g., Quip by salesforce.com, Inc.), database as a service (e.g., Database.com™ by salesforce.com, Inc.), Data as a Service (DAAS) (e.g., Data.com by salesforce.com, Inc.), Platform as a Service (PAAS) (e.g., execution runtime and application (app) development tools; such as, Heroku™ Enterprise, Thunder, and Force.com® and Lightning by salesforce.com, Inc.), an analytics service (e.g., Einstein Analytics, Sales Analytics, and/or Service Analytics by salesforce.com, Inc.), a community service (e.g., Community Cloud and Chatter by salesforce.com, Inc.), an Internet of Things (IoT) service (e.g., Salesforce IoT and IoT Cloud by salesforce.com, Inc.), industry specific services (e.g., Financial Services Cloud and Health Cloud by salesforce.com, Inc.), an Artificial Intelligence service (e.g., Einstein by Salesforce.com, Inc.), and/or Infrastructure as a Service (IAAS) (e.g., virtual machines, servers, and/or storage). For example, system 340 may include an application platform 344 that enables PAAS for creating, managing, and executing one or more applications developed by the provider of the application platform 344, users accessing the system 340 via one or more of user electronic devices 380A-S, or third-party application developers accessing the system 340 via one or more of user electronic devices 380A-S.

In some implementations, the system 340 is a multi-tenant cloud computing architecture and one or more of the service(s) 342 may utilize one or more multi-tenant databases 346, as well as system data storage 350 for system data 352 accessible to system 340. In certain implementations, the system 340 includes a set of one or more servers that are running on server electronic devices and that are configured to handle requests for any authorized user associated with any tenant (there is no server affinity for a user and/or tenant to a specific server). The user electronic device 380A-S communicate with the server(s) of system 340 to request and update tenant-level data and system-level data hosted by system 340, and in response the system 340 (e.g., one or more servers in system 340) automatically may generate one or more Structured Query Language (SQL) statements (e.g., one or more SQL queries) that are designed to access the desired information from the one or more multi-tenant database 346 and/or system data storage 350.

In some implementations, the service(s) 342 are implemented using virtual applications dynamically created at run time responsive to queries from the user electronic devices 380A-S and in accordance with metadata, including: 1) metadata that describes constructs (e.g., forms, reports, workflows, user access privileges, business logic) that are common to multiple tenants; and/or 2) metadata that is tenant specific and describes tenant specific constructs (e.g., tables, reports, dashboards, interfaces, etc.) and is stored in a multi-tenant database. To that end, the program code 360 may be a runtime engine that materializes application data from the metadata; that is, there is a clear separation of the compiled runtime engine (also known as the system kernel), tenant data, and the metadata, which makes it possible to independently update the system kernel and tenant-specific applications and schemas, with virtually no risk of one affecting the others. Further, in one implementation, the application platform 344 includes an application setup mechanism that supports application developers' creation and management of applications, which may be saved as metadata by save routines. Invocations to such applications, including the above described cloud service, may be coded using Procedural Language/Structured Object Query Language (PL/SOQL) that provides a programming language style interface. A detailed description of some PL/SOQL language implementations is discussed in U.S. Pat. No. 7,730,478 entitled, METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007. Invocations to applications may be detected by one or more system processes, which manages retrieving application metadata for the tenant making the invocation and executing the metadata as an application in a software container (e.g., a virtual machine).

Network 382 may be any one or any combination of a LAN (local area network), WAN (wide area network), telephone network, wireless network, point-to-point network, star network, token ring network, hub network, or other appropriate configuration. The network may comply with one or more network protocols, including an Institute of Electrical and Electronics Engineers (IEEE) protocol, a 3rd Generation Partnership Project (3GPP) protocol, a 4th generation wireless protocol (4G) (e.g., the Long Term Evolution (LTE) standard, LTE Advanced, LTE Advanced Pro), a fifth generation wireless protocol (5G), or similar wired and/or wireless protocols, and may include one or more intermediary devices for routing data between the system 340 and the user electronic devices 380A-S.

Each user electronic device 380A-S (such as a desktop personal computer, workstation, laptop, Personal Digital Assistant (PDA), smart phone, augmented reality (AR) devices, virtual reality (VR) devices, etc.) typically includes one or more user interface devices, such as a keyboard, a mouse, a trackball, a touch pad, a touch screen, a pen or the like, video or touch free user interfaces, for interacting with a graphical user interface (GUI) provided on a display (e.g., a monitor screen, a liquid crystal display (LCD), a head-up display, a head-mounted display, etc.) in conjunction with pages, forms, applications and other information provided by system 340. For example, the user interface device can be used to access data and applications hosted by system 340, and to perform searches on stored data, and otherwise allow a user 384 to interact with various GUI pages that may be presented to a user 384. User electronic devices 380A-S might communicate with system 340 using TCP/IP (Transfer Control Protocol and Internet Protocol) and, at a higher network level, use other networking protocols to communicate, such as Hypertext Transfer Protocol (HTTP), FTP, Andrew File System (AFS), Wireless Application Protocol (WAP), File Transfer Protocol (FTP), Network File System (NFS), an application program interface (API) based upon protocols such as Simple Object Access Protocol (SOAP), Representational State Transfer (REST), etc. In an example where HTTP is used, one or more user electronic devices 380A-S might include an HTTP client, commonly referred to as a "browser," for sending and receiving HTTP messages to and from server(s) of system 340, thus allowing users 384 of the user electronic device 380A-S to access, process and view information, pages and applications available to it from system 340 over network 382.

Conclusion

In the above description, numerous specific details such as resource partitioning/sharing/duplication implementations, types and interrelationships of system components, and logic partitioning/integration choices are set forth in order to provide a more thorough understanding. It will be appreciated, however, by one skilled in the art, that the invention may be practiced without such specific details. In other instances, control structures, logic implementations, opcodes, means to specify operands, and full software instruction sequences have not been shown in detail since those of ordinary skill in the art, with the included descriptions, will be able to implement what is described without undue experimentation.

References in the specification to "one implementation," "an implementation," "an example implementation," etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is within the knowledge of one skilled in the art to affect such feature, structure, or characteristic in connection with other implementations whether or not explicitly described.

For example, the figure(s) illustrating flow diagrams are sometimes described with reference to the figure(s) illustrating block diagrams, and vice versa. Whether or not explicitly described, the alternative implementations discussed with reference to the figure(s) illustrating block diagrams also apply to the implementations discussed with reference to the figure(s) illustrating flow diagrams, and vice versa. At the same time, implementations, other than those discussed with reference to the block diagrams, for performing the flow diagrams are within the scope of this description, and vice versa.

Bracketed text and blocks with dashed borders (e.g., large dashes, small dashes, dot-dash, and dots) may be used herein to illustrate optional operations and/or structures that add additional features to some implementations. However, such notation should not be taken to mean that these are the only options or optional operations, and/or that blocks with solid borders are not optional in certain implementations.

In the detailed description and claims, the term "coupled," along with its derivatives, may be used. "Coupled" is used to indicate that two or more elements, which may or may not be in direct physical or electrical contact with each other, co-operate or interact with each other.

While the flow diagrams in the figures show a particular order of operations performed by certain implementations, it should be understood that such order is exemplary (e.g., alternative implementations may perform the operations in a different order, combine certain operations, overlap certain operations, etc.).

While the above description includes several exemplary implementations, those skilled in the art will recognize that the invention is not limited to the implementations described and can be practiced with modification and alteration within the spirit and scope of the appended claims. The description is thus illustrative instead of limiting.

What is claimed is:

1. A non-transitory machine-readable storage medium that provides instructions that, if executed by a machine, are configurable to cause said machine to perform operations comprising:
   while a proxy routes production traffic to a first application (app) version that runs in a plurality of container orchestration system (COS) pods having first app version containers, receiving configuration information including an identification of a second app version container image for a second app version, wherein the second app version is an updated version of the first app version;
   bringing up COS pods having second app version containers based on the second app version container image identified in the configuration information;
   causing test and/or warmup traffic to be routed to the second app version containers while the production traffic continues to be routed to the first application version, the causing including:
      causing the proxy to be configured with a set of one or more routing rules that distinguish between production traffic and test and/or warmup traffic;
      causing generation and transmission of the test and/or warmup traffic with a value in a header field that the proxy can use to route that traffic to the second app version;
   receiving an indication regarding the routing of the test and/or warmup traffic to the second app version;
   responsive to the indication, causing a transition to sending production traffic to the second app version containers instead of to the first app version; and
   starting a process to shut down the plurality of COS pods having the first app version containers.

2. The non-transitory machine-readable storage medium of claim 1, wherein the configuration information includes a services collection identifier and a second app version identifier.

3. The non-transitory machine-readable storage medium of claim 1, wherein the first application (app) version communicates with a database management system (DBMS) using a database name assigned to the first app version, wherein the configuration information includes DBMS connection information for the first app version and the second app version, and the operations further include:
   preparing the DBMS by loading app version specific database release artifacts within the second app version container image using the DBMS connection information for the second app version.

4. The non-transitory machine-readable storage medium of claim 3, wherein the operations further include the preliminary operations of:
   preloading the DBMS connection information for the second app version into the DBMS; and
   registering the second app version container image in a container registry.

5. The non-transitory machine-readable storage medium of claim 3, wherein the DBMS connection information for the first app version and the second app version each include database credentials.

6. The non-transitory machine-readable storage medium of claim 5, wherein the database credentials including database usernames and passwords.

7. The non-transitory machine-readable storage medium of claim 5, wherein the DBMS connection information includes a database instance name.

8. The non-transitory machine-readable storage medium of claim 3, wherein the app version specific database release artifacts include a PL/SQL package and a set or one or more query optimization hints.

9. The non-transitory machine-readable storage medium of claim 3, wherein the operations further comprise:
   causing a set of post release database cleanup activities related to the first app version.

10. The non-transitory machine-readable storage medium of claim 1, wherein the operations further comprise:
   providing a set of parameters from the configuration information to a reusable deployment pipeline responsible for causing the transition to sending production traffic to the second app version containers instead of the first app version after the second app version containers have been validated.

11. The non-transitory machine-readable storage medium of claim 1, wherein the operations further comprise:
   for each of the COS pods having the second app version containers:
      when the second app version container is live, responding affirmatively to requests whether the second app version container is live;
      monitoring whether the transition to sending production traffic to the second app version container has occurred; and
      responsive to requests as to whether the second app version container is ready, the second app version container responding affirmatively after determining that the transition to sending production traffic to the second app version container has occurred.

12. The non-transitory machine-readable storage medium of claim 11, wherein the process comprises:
   when one of the plurality of COS pods having the first app version containers is ready to be shut down, starting a timer based on a time period indicated in the configuration information and instructing the first app version container to gracefully shut down; and
   when the timer expires, forcing the COS pod with the first app version container to shut down if it has not already.

13. The non-transitory machine-readable storage medium of claim 11, wherein the monitoring whether the transition to sending production traffic to the second app version container has occurred includes:
   deriving a URL based on the configuration information; and
   pinging that URL until it indicates that the second app version container is receiving production traffic.

14. The non-transitory machine-readable storage medium of claim 11, wherein the requests inquiring whether the second app version container is ready are readiness probe requests.

15. The non-transitory machine-readable storage medium of claim 1, wherein the bringing up COS pods is performed until their number meets a number of COS pods from the configuration information.

16. The non-transitory machine-readable storage medium of claim 1, wherein the causing the transition is started when a threshold number of the COS pods having the second app version containers are live.

17. The non-transitory machine-readable storage medium of claim 1, wherein the process comprises:
   after causing the transition, starting a set of one or more timers based on a time period indicated in the configuration information and instructing the first app version containers to gracefully shut down; and
   based on expiration of the set of timers, forcing any of the COS pods having the first app version containers that are not yet shut down to shut down.

\* \* \* \* \*